United States Patent [19]

Tone et al.

[11] Patent Number: 5,146,275
[45] Date of Patent: Sep. 8, 1992

[54] COMPOSITE IMAGE FORMING APPARATUS

[75] Inventors: Eiichi Tone; Yosuke Ohata; Kazuto Hori, all of Osaka, Japan

[73] Assignee: Mita Industrial Co., Ltd., Osaka, Japan

[21] Appl. No.: 625,850

[22] Filed: Dec. 11, 1990

[30] Foreign Application Priority Data

Dec. 13, 1989 [JP] Japan .................................. 1-323581
Dec. 13, 1989 [JP] Japan .................................. 1-323582
May 25, 1990 [JP] Japan .................................. 2-135812
May 25, 1990 [JP] Japan .................................. 2-135813

[51] Int. Cl.$^5$ ...................... G03G 15/04; G03G 21/00
[52] U.S. Cl. ...................... 355/244; 355/218
[58] Field of Search .................. 355/244, 202, 218

[56] References Cited

U.S. PATENT DOCUMENTS

| | | | |
|---|---|---|---|
| 4,251,152 | 2/1981 | Miyakawa et al. | 355/244 |
| 4,637,707 | 1/1987 | Kasahara et al. | 355/218 |
| 4,989,038 | 1/1991 | Kobayashi et al. | 355/202 |
| 4,989,042 | 1/1991 | Muramatsu et al. | 355/244 |

FOREIGN PATENT DOCUMENTS 0044730 2/1987 Japan .
0253775 10/1989 Japan .

Primary Examiner—A. T. Grimley
Assistant Examiner—Nestor R. Ramirez
Attorney, Agent, or Firm—Koda and Androlia

[57] ABSTRACT

A composite image forming apparatus including an analog or a digital image forming apparatus of the type in which an optical system moves relative to a document placed on a document table, the image on the document is scanned by the optical system and the image is transferred to a sheet of image transferring paper and a belt like recording medium on which additional or optional images from which additional or optional images other than the document image can be transferred to the sheet of image transferring paper.

33 Claims, 15 Drawing Sheets

(a)

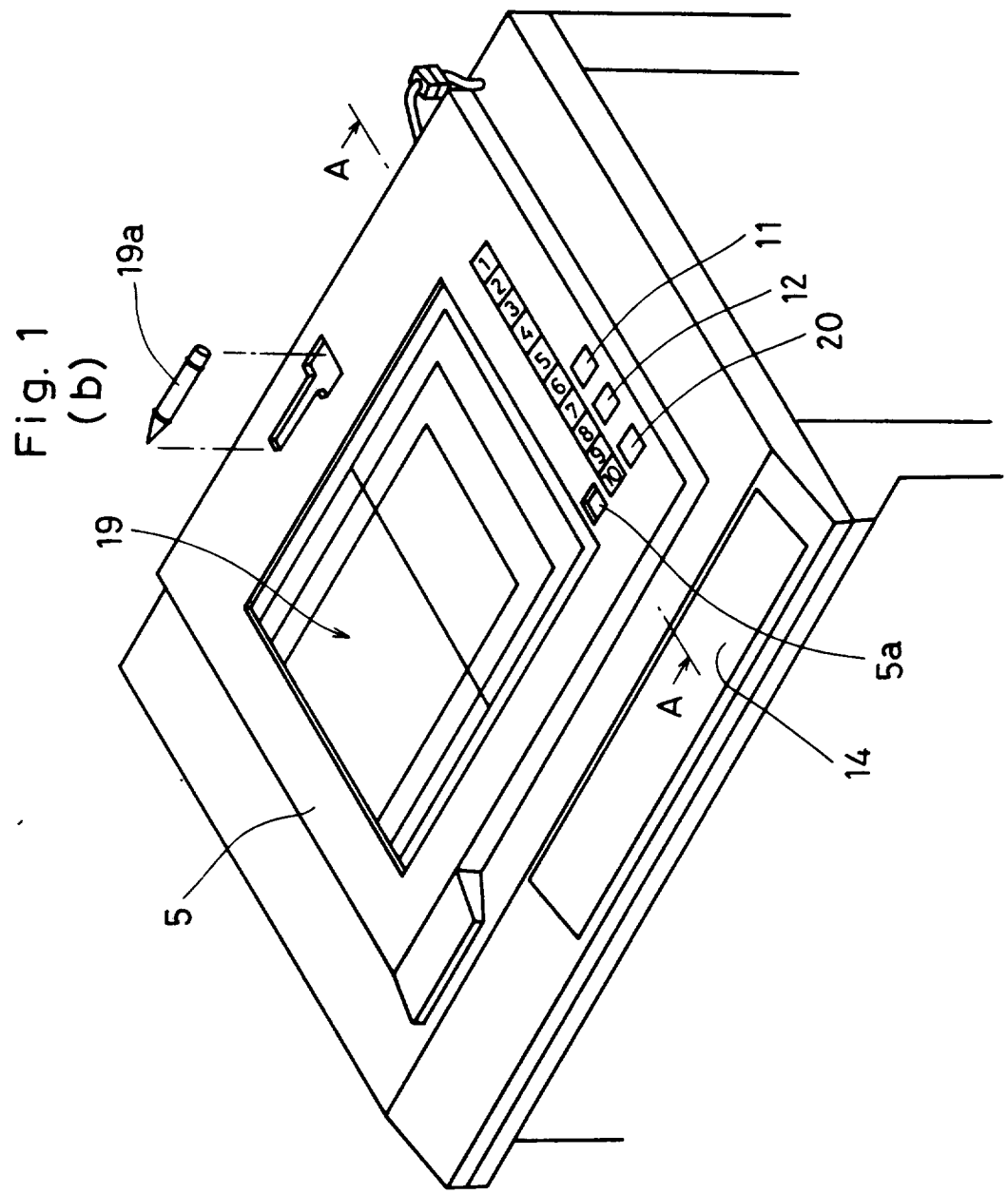

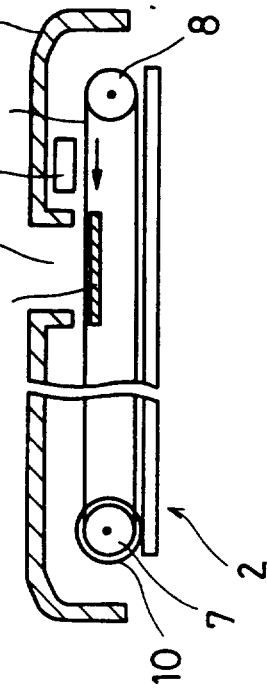
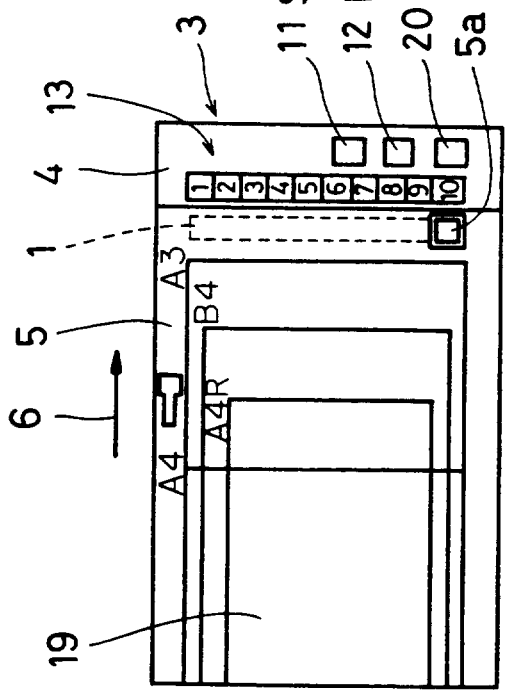

(e)

Photosensitive body (f)

Photosensitive body

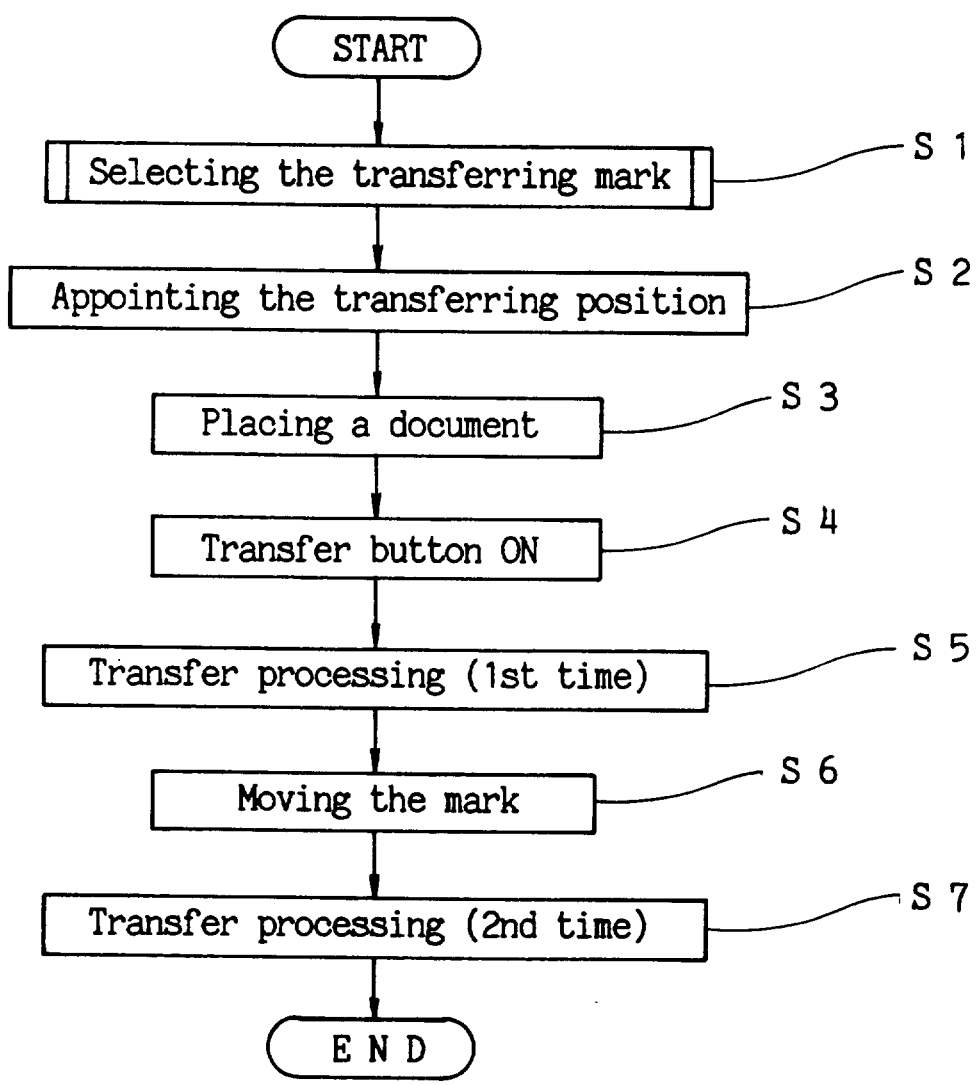

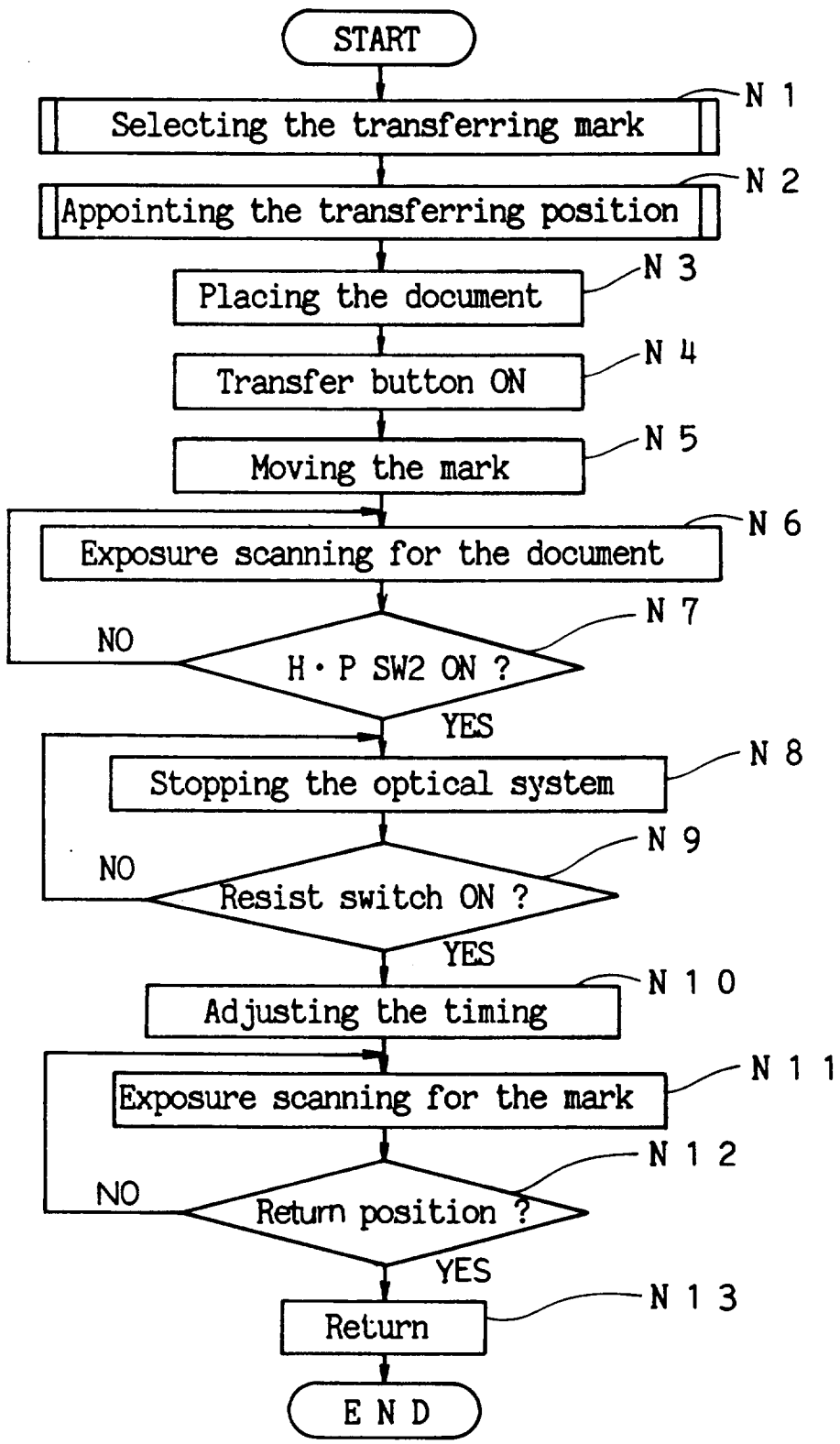

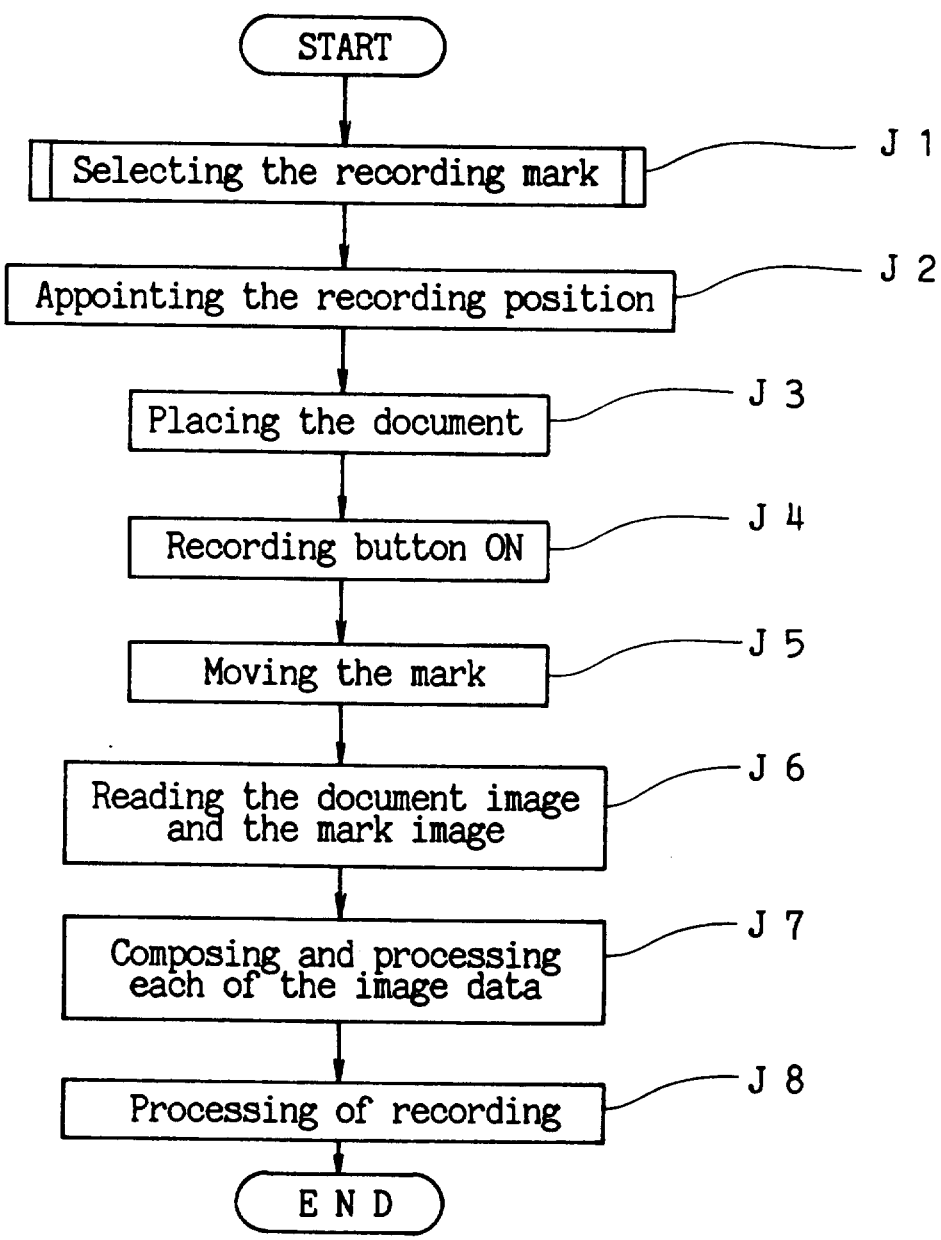

COMPOSITE IMAGE FORMING APPARATUS

BACKGROUND OF THE INVENTION

1. Field of the Invention

The present invention relates to an analog or a digital image forming apparatus in which the optical system moves relatively to a document placed on the document table, the image of the document is scanned by the optical system and transferred to a sheet of image transferring paper, and more particular relates to an analog or a digital image forming apparatus furnished with a feature by which additional images (marks) other than the document image can be transferred to the sheet of image transferring paper.

2. Description of the Prior Art

An image forming apparatus having the above features, disclosed by, for instance, the Japanese Pat. Laid-Open gazette No. 53-143232 has been already known.

Namely, in the image forming apparatus disclosed in the above gazette, an accommodation slot is provided at a belt arranged on the document table, and a card on which a mark is described is inserted into the accommodation slot. And the accommodation slot is transferred to the position exposable by the optical system by moving the belt, thereby causing other marks than the document image can be transferred to a sheet of image transferring paper.

Heretofore, in a conventional image forming apparatus so composed as shown in the above, a card on which the corresponding mark is described must be re-inserted in the accommodation slot whenever changing the mark to be transferred to the sheet of image transferring paper. So, the conventional image forming apparatus inherently has such a problem that the operation takes much time.

SUMMARY OF THE INVENTION

This application is to propose an analog or a digital image forming apparatus having a feature by which any optional mark can be remarkably simply transferred to a sheet of image transferring paper without replacing cards on which a mark is described.

In order to accomplish the above object, the gist of the means employed by the present invention is as follows;

The first invention thereof relates to an analog image forming apparatus in which an optical system moves relatively to a document, thereby causing an image of the document to be scanned by the optical system and to be transferred to a sheet of image transferring paper, comprising:

a belt-like recording medium in which a plurality of optional marks can be physically described, mark selecting means for selecting an appointed mark or a plurality of marks which are consecutively described in the recording medium, a mark travelling mechanism for driving and travelling the belt-like recording medium so that a mark selected by the mark selecting means can be moved, first control means for controlling the mark travelling mechanism and for driving the recording medium to an appointed position, paper feed timing adjusting means for adjusting the timing of paper feed for the exposure scanning and for feeding paper when making a transfer, and first mark extracting means for extracting an image of the portion of a mark selected by the mark selecting means according to the timing adjustment amount by the paper feed timing adjusting means and the position of a mark positioned in the main scanning direction of a mark positioned by the first controlling means.

The second invention thereof further comprises conventional transfer means for transferring the image of a document onto a sheet of image transferring paper and mark transfer means for transferring the image of a mark onto a sheet of image transferring paper, in addition to the constituting means of the first invention.

The third invention thereof further comprises mark detecting means for detecting the shape of a mark on the recording medium and second controlling means for controlling the mark travelling mechanism and for driving the recording medium to the optional position according to the result of having detected the shape of the mark by the mark detecting means instead of the first controlling means and the first mark extracting means, in addition to the constituting means of the first invention.

The fourth invention thereof further comprises conventional transferring means for transferring the image of a document onto a sheet of image transferring paper and mark transferring means for transferring the image of a mark onto a sheet of image transferring paper, in addition to the constituting means of the third invention.

The fifth invention thereof relates to an analog image forming apparatus in which the optical system moves relatively to a document, and the image of a document is scanned by the optical system and is transferred to a sheet of image transferring paper, comprising:

first detecting means for detecting the first origin position of scanning of the optical system to the placing area of the document on the document table which is divided into the placing area of document and the scanning area of a mark, second detecting means placed in the vicinity of the boundary portion between the placing area of the document and the scanning area of a mark for detecting the second origin position of scanning of the optical system to the scanning area of a mark, a recording medium arranged in the scanning area of the mark, in which an optional mark can be described, conventional transferring means for transferring the image of a document placed in the placing area of the document onto a sheet of image transferring paper by letting the optical system scan from the first origin position of scanning of the optical system, which is detected by the first detecting means, and consecutive mark transferring means for consecutively transferring the image of a mark described on the recording medium onto the sheet of image transferring paper on which the image of the document is described by the usual transferring means, by letting the optical system scan from the second origin position of scanning of the optical system which is detected by the second detecting means.

The sixth invention thereof relates to a digital image forming apparatus in which an optical system moves relatively to a document, thereby causing an image of a document to be read by the optical reading means and to be recorded on a sheet of recording paper, comprising;

a belt-like recording medium in which a plurality of optional marks can be physically described, mark selecting means for selecting one or more marks of a plurality of the marks described in the recording medium, a mark travelling mechanism for driving and travelling the belt-like recording medium so that the mark selected by the mark selecting means can be moved, third controlling means for controlling the mark travelling mechanism and for driving the recording medium to an appointed position, mark reading means for reading the image of a mark on the recording medium driven to an appointed position by the third controlling means, third data extracting means for extracting the data of the mark image selected by the mark selecting means of the mark images read by the mark reading means, and first recording processing means for outputting the data of the mark image extracted by the third data extracting means, corresponding to the recording position on a sheet of recording paper for recording processing.

The seventh invention thereof comprises image reading means for reading the image of a mark on the recording medium driven to an appointed position by the third controlling means and the image of a document placed on the document table instead of the mark reading means and the fourth data extracting means for extracting the data of the mark image selected by the mark selecting means of the mark images read by the image reading means instead of the third data extracting means in the constitution according to the sixth invention thereof, and further provides composing processing means for composing processing the data of the mark images extracted by the fourth data extracting means and the data of the document images and the second recording processing means for outputting the image data composed and processed by the composing processing means, corresponding to the recording position on the sheet of recording paper instead of the first recording processing means.

The eighth invention thereof further comprises mark detecting means for detecting the shape of a mark on the recording medium added to the constitution according to the seventh invention, and the fourth controlling means for controlling the mark travelling mechanism on the basis of the result of detecting the mark shape by the mark detecting means and for driving the recording medium to an optional position, so that the mark reading means can read the mark images on the recording medium driven to the appointed position by the fourth controlling means.

The ninth invention thereof is that the third controlling means in the constitution according to the seventh invention thereof is displaced with mark detecting means for detecting the shape of a mark on the recording medium and the fourth controlling means for controlling the mark travelling mechanism according to the result of the detection of the mark shape by the mark detecting means and driving the recording medium up to an appointed position.

The tenth invention thereof relates to a digital image forming apparatus in which an optical system moves relatively to a document, thereby causing an image of a document to be read by the optical reading means and to be recorded on a sheet of recording paper, comprising;

first detecting means for detecting the first origin position of moving of the optical system to the placing area of the document on the document table which is divided into the placing area of document and the scanning area of a mark, second detecting means arranged in the vicinity of the boundary portion between the placing area of the document and the scanning area of the mark for detecting the second origin position of moving of the image reading means to the scanning area of the mark, a recording medium arranged in the scanning area of the mark, in which an optional mark can be described, document reading means for reading the image of a document placed in the placing area of the document by moving the image reading device from the first origin position of moving of the image reading means, which is detected by the first detecting means, mark reading means for reading the image of a mark described on the recording medium by moving the image reading means from the second origin position of moving of the image reading means, which is detected by the second detecting means, composing processing means for composing a part or the whole of the image data read by the mark reading means and the image data read by the document reading means, and third recoding processing means for outputting the image data composed and processed by the composing processing means, corresponding to the recording position on the sheet of recording paper.

In an analog image forming apparatus according to the first invention, a plurality of optional marks are physically described on a belt-like recording medium (for instance by means of a felt pen, etc.), and as one mark or two or more marks which are consecutively described, of the plurality of marks, is (or are) selected by the mark selecting means, the mark travelling mechanism is controlled by the first controlling means, thereby causing the recording medium to be driven to a position where the marks selected on the recording medium can be exposed by the optical system.

And when transferring a mark, the timing of paper feed for exposure scanning of the mark is adjusted by the paper feed timing adjusting means and a sheet of image transferring paper is fed.

As shown in the above, the mark transferring position on the sheet of image transferring paper is established by the first controlling means and the paper feed timing adjusting means.

And according to the timing adjustment amount by the paper feed timing adjusting means and the position of the mark positioned in the main scanning direction by the first controlling means, other image than the mark portion selected by the mark selecting means on a photosensitive body is deleted by the mark extracting means, and the image of the mark portion is extracted by the mark extracting means.

As a result, only the mark selected by the mark selecting means is transferred to an optional position on the sheet of image transferring paper. Namely, the object of the first invention is to transfer a selected mark only to an optional position on the sheet of image transferring paper. At this point, the first invention is different from the second invention of which object is to compose a mark and other image.

In an analog image forming apparatus according to the second invention, as the image of a document is transferred to the sheet of image transferring paper by the usual transfer means (the first-time transfer processing), the secod-time transfer processing is consecutively executed by the mark transferring means, thereby causing the selected mark to be transferred to an optional position on the sheet of image transferring paper.

In this case, after a mark image is transferred to the sheet of image transferring paper by the mark transferring means, the document image can be transferred to the sheet of image transferring paper by the usual transferring means.

Namely, in an analog image forming according to the second invention, the document image and an optional mark image can be composed on the sheet of image transferring paper.

In an analog image forming apparatus according to the third invention, presence or absence of a mark on the recording medium can be judged through detecting the shape of a mark on the recording medium by the mark detecting means, and the appointed mark can be quickly selected from the area on the recording medium, in which the mark is described, and the recording medium can be driven to the appointed position by the second controlling means.

However, as well as in the first invention, the object of the third invention is to transfer and process the mark images only and is not to compose and process the mark images and other document images.

Also, in the first and the third inventions, it is possible to actually compose the mark images to another image by feeding a sheet of image transferring paper on which another image has been formed in advance.

In the fourth invention, another document image can be transferred and processed, following or prior to independent transfer processing of the mark image in the third invention, that is., the document image and an optional mark image can be composed on a sheet of image transferring paper by making the transfer processing two times as well as in the second invention.

In an analog image forming apparatus according to the fifth invention, an optional mark can be described on a recording medium by using a felt pen, etc.

When processing the image, the image of a document placed in the placing area of the document is transferred to the sheet of image transferring paper by letting the optical system scan from the first origin position of scanning of the optical system detected by the first detecting means and by feeding a sheet of image transferring paper from the paper feeding section. The optical system comes to a stop before the second origin position of scanning described below, and the sheet of image transferring paper on which the document image has been transferred is fed to the paper feeding section again.

Consecutively, the mark image can be transferred to the sheet of image transferring paper on which the document image has been transferred, by letting the optical system scan from the second origin position of scanning of the optical system detected by the second detecting means arranged in the vicinity of the boundary portion between the placing area of the document and the mark scanning area and by feeding the sheet of image transferring paper again.

Namely, in analog image forming apparatus according to this invention, it is possible to compose the image of a document and an optional mark image on a sheet of image transferring paper by making an exposure scanning once.

In a digital image forming apparatus according to the sixth invention, a plurality of optional marks can be physically described on a belt-like recording medium (by using a felt pen, etc.), and as an appointed mark is selected from the plurality of marks by the mark selecting means, the mark travelling mechanism is controlled by the third controlling means and the recording medium can be driven to the appointed position where the appointed mark on the recording medium can be read by the image reading device.

And the image of the mark on the recording medium driven to the appointed position by the third controlling means is read by the mark reading means, and only the data of the mark image selected by the mark selecting means of the mark images read as shown in the above can be extracted by the third data extracting means.

Thus, the data of the mark images so extracted as shown in the above is outputted corresponding to the recording position on the sheet of recording paper and is processed for recording by the first record processing means.

As a result, only the appointed mark selected by the mark selecting means is recorded at an appointed position on the sheet of recording paper.

In a digital image forming apparatus according to the seventh invention, the image of a mark on the recording medium driven up to the appointed position by the third controlling means in the digital image forming apparatus according to the sixth invention is read by the image reading means together with the image of the document placed on the document table, and only the data of the mark image selected by the mark selecting means, of the mark images read by the image reading means, is extracted by the fourth data extracting means.

And the data of the mark image extracted by the fourth data extracting means and the data of the document images can be processed for composition by the composing processing means. The data processed for composition by the composing processing means is outputted, corresponding to the recording position on the sheet of recording paper and is processed and recorded by the second record processing means.

Namely, in the digital image forming apparatus according to the seventh invention, it is possible to compose the document images and the images of optional marks on a sheet of recording paper.

In a digital image forming apparatus according to the eighth invention, presence or absence of a mark on the recording medium can be judged through detecting the shape of a mark on the recording medium by the mark detecting means, and an appointed mark can be quickly selected in the area on the recording medium, in which the marks are described, and the recording medium can be driven up to the appointed position by the third controlling means.

However, the object of the eighth invention is only to make transfer processing of the mark images as well as in the sixth invention but is not to compose the mark image and other document image.

In the sixth invention and the eighth invention, in fact it is possible to compose the mark image and a document image by feeding the sheet of image transferring paper on which the document image has been transferred in advance.

The object of the ninth invention is to compose an image of a document and an optional mark image on a sheet of image transferring paper by making a transfer processing of another document image, i.e., making a transfer processing again as well as in the seventh invention, following or prior to independent transfer processing of the mark image in the eighth invention.

In the tenth invention, a new reference origin point is set for exposure scanning of an image described on a recording medium, separately from the reference origin point of the document scanning. As the position of the mark image is detected in accordance with this new reference origin point, an error which may be produced when detecting the position of a mark from the reference origin point for the document scanning, which is far from the mark document, is not accumulated. As the accuracy for detecting the position of the mark image is high, errors are not produced in the position of recording marks.

DETAILED DESCRIPTION OF THE PREFERRED EMBODIMENTS

An analog or a digital image forming apparatus according to the present invention can be composed such that only the image of mark can be transferred to a sheet of image transferring paper or both the image of a mark and the images of a document can be composed on a sheet of image transferring paper.

Also, in this case, a mark image can be transferred later on the sheet of image transferring paper to which the images of a document have been transferred. And it is needless to say that the document images can be transferred later on the sheet of image transferring paper on which the mark image has been transferred in advance.

The ensuing description explains an embodiment in which the present invention is applied to an analog image forming apparatus.

In the first embodiment described below, an analog image forming apparatus composed such that the mark image and the document image can be composed on a sheet of image transferring paper is explained as an example firstly.

The whole configuration of the analog image forming apparatus A is described with reference to FIG. 6.

Figure 6:
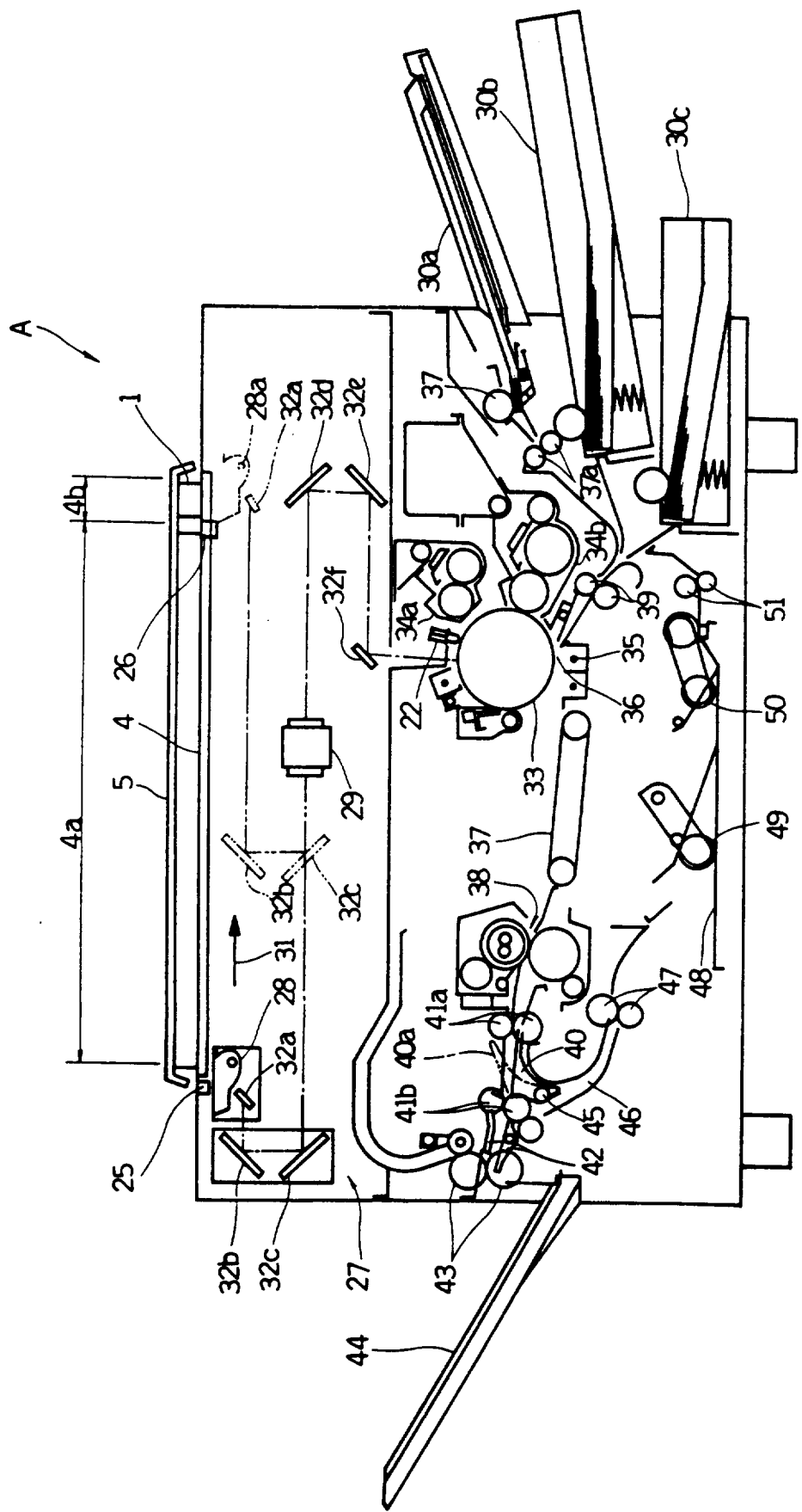
FIG. 6 is a rough elevational view showing the whole configuration of one of the examples of an analog copying machine to which the present invention is applicable.

An analog image forming apparatus A shown in FIG. 6 is composed as a copying machine having three paper feeding sections of a hand paper feeding section 30a, paper feeding cassettes 30b and 30c at the right side thereof.

A document table 4 is provided on the upper surface of the analog image forming apparatus A. A lamp unit 28 which can move from the solid line position 28 to the two-dashed line position 28a along this document table 4 scans a document placed on the document table 4.

A recording medium 1 described later and mark travelling mechanism 2 (FIG. 1(c)) of the drive system thereof are provided at the extreme downstream section in the exposure scanning direction shown with an arrow 31 of a document pusher 5 by which a document placed on the document table is pushed down. The recording medium 1 is exposed and scanned by the lamp unit 28 as described below.

The light emitting from the lamp unit 28 is reflected by a document on the document table or the recording medium 1 and makes an incidence to a group of lens 29 by way of mirrors 32a, 32b, and 32c. Furthermore, it is imaged on the surface of a photosensitive body 33 via mirrors 32d, 32e and 32f and forms an electrostatic latent image, corresponding to the document image or the mark image on the recording medium 1, on the surface of the photosensitive body in accompanying with the rotation thereof.

The electrostatic latent image is developed to toner image in a short time by either of a developer 34a or 34b (the developer 34b in the Figure) in accompanying with the rotation of the photosensitive body 33 and comes to the transfer section 36 opposite to a transfer charger 35.

On the other hand, a sheet of image transferring paper which is sent out from either of the paper feeding sections 30a through 30c, for instance, the hand paper feeding section 30a, by a paper feeding roller 37, is inserted into a pair of resist rollers 39 through the feed roller 37a and temporarily comes to a stop. The resist rollers 39 send out a sheet of image transferring paper to the transferring portion 36 at an appointed timing from starting of the optical system including the lamp unit shown by the solid line position (home position).

A toner image on a sheet of image transferring paper to which the toner image is transferred by the transfer section 36 is fixed at the fixing section 38.

A pair of feed rollers 41a, a changer guide 40, a pair of feed rollers 41b, a changer guide 42, a delivery roller 43 and a delivery tray 44 are installed at the side of downstream of the fixing section 38. The changer guide 40 swings, centering around an axis 45, between the solid line position 40 and the two-dashed line position 40a, thereby causing the transferring direction of a sheet of image transferring paper to be changed.

With the changer guide 40 located at the solid line position 40, the sheet of image transferring paper which comes out from the fixing section 38 is delivered to the delivery tray 44 by means of the delivery roller 43 through pairs of feed rollers 41a and 41b and the changer guide 42.

When making a transfer processing for only the mark described on the recording medium 1 or a document placed on the document table 4 only one time, the changer guide 40 is changed to the solid line position as shown in the above, and the sheet of image transferring paper receives only one-time transfer processing and is delivered to the delivery tray 44.

On the other hand, in the case of composing the image of a mark or the document onto the sheet of image transferring paper which has received transfer processing one time at the transfer section 36 as shown in the above, a position of the changer guide 40 is changed to the two-dashed line position 40a before the sheet of image transferring paper is sent out by means of a pair of feed rollers 41a after having received the first-time transfer processing at the transfer section 36 and having received the fixing processing at the fixing section 38. For this reason, the sheet of image transferring paper sent out by the pair of feed roller 41a is guided by the changer guide 40 and goes into the guide duct 46 arranged at the lower part. Furthermore, it is fed to the intermediate tray 48 from a pair of feed rollers 47.

The leading edge of the sheet of image transferring paper which is sent out from the intermediate tray 48 through the pre-feed roller 49 and the paper re-feed roller 50 is inserted into a pair of resist rollers 39 by a pair of the feed rollers 51 again and the sheet of image transferring paper comes to a stop.

Hereafter, the exposure scanning for a document or a mark on the recording medium 1 is executed by the lamp unit 28 and a pair of the resist rollers 39 begin to rotate in timing therewith, thereby causing a new image to be composed and transferred to the pre-transferred image.

At this time, the changer guide 40 is changed to the position indicated with the solid line 40, and the sheet of image transferring paper on which a new image has been composed and transferred is sent to the fixing section 38 by a transfer belt 37. After the toner image is fixed, the sheet of image transferring paper is delivered to the delivery tray 44 from the delivery roller 43 through a pair of feed rollers 41a, a changer guide 40, a pair of feed rollers 41b, and a changer guide 42.

Next, the features of the analog image forming apparatus are explained in details.

Figure 1:
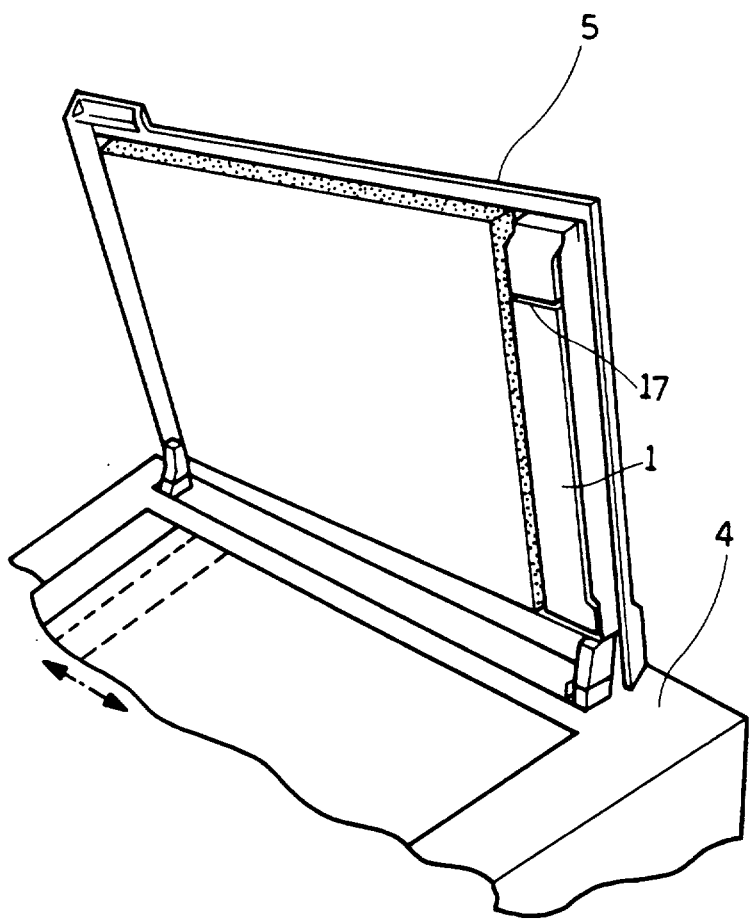
FIG. 1 shows the structure and construction of the main portions of an analog or a digital image forming apparatus according to an embodiment of the present invention, FIG. 1 (a) is a perspective view with the document pusher open, FIG. 1 (b) is a perspective view with the document pusher closed, FIG. 1 (c) is a sectional view taken along the line A—A' in FIG. 1 (b), FIG. 1 (d) is a plan view of the document pusher portion, FIG. 1 (e) is a rough elevational view with the document pusher closed, FIG. 1 (f) is a view equivalent to FIG. 1 (e) with the optical scanned.
Figure 1:
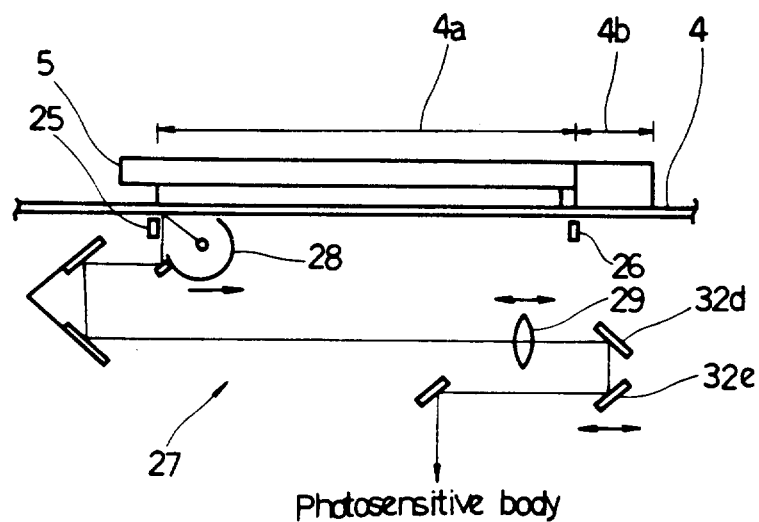
Figure 1:
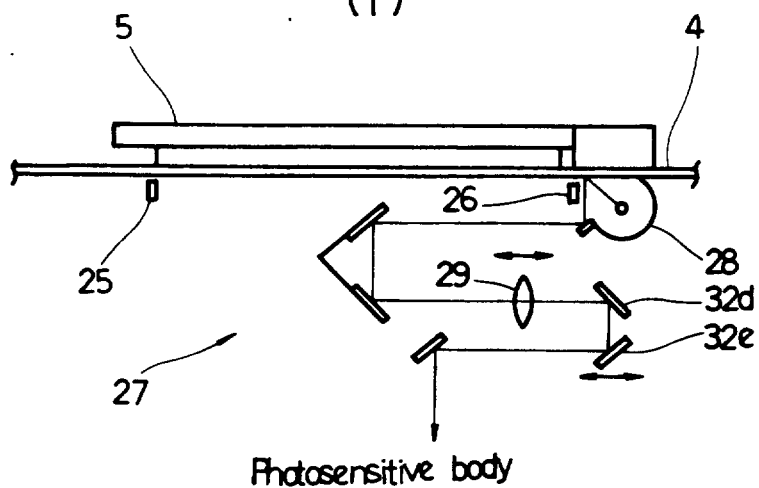

A recording medium 1 indicated in FIG. 1 is for physically describing a plurality of optional marks, and, for instance, is composed of a detachable resin-based white belt. Therefore, even though a mark is described on the surface of the recording medium by a felt pen or a stamping method, the mark is erasable by wiping it off. So, it can be continuously used.

Also, the recording medium 1 is composed of for instance a paper belt. If it is replaced with a new paper belt after all the area on the recording medium is filled with marks, the deleting work of the marks described on the recoding medium can be saved.

The recording medium 1 shown in the above is arranged outside the document placing area 4a of the document pusher 5 attached to the document table 4 indicated in FIG. 1 (d) and at the forward side of the sub scanning direction (the direction of an arrow 6) to the document from the home position of the optical system and is suspended to be endless on a pair of the rollers 7 and 8 (FIG. 1 (c)) which are oppositely arranged over the main scanning direction (the right angle to the arrow 6) of the document. And a tablet 19 which is an already-known position designating means used for such edition as trimming, masking, etc. is provided in the document placing area 4a of the document pusher 5. An opening 5a for describing a mark is provided on the document pusher 5 corresponding to the upper portion of the recording medium 1, and a stamp plate 9 for supporting the recording medium 1 when describing a mark is provided at the underside of the recording medium corresponding to the opening 5a.

The recording medium 1 is jogged or inched one after another per lengthwise dimension corresponding to the opening 5a by means of a stepping motor 10 which rotates the roller 7 whenever operating the increment switch 20 indicated in FIG. 1 (d).

In this case, the rollers 7 and 8, and the stepping motor 10 constitute the mark travelling mechanism 2 which drives and moves the recording medium 1.

Mark selecting means 3 is for selecting one or two or more optional marks in the mark scanning area 4b (FIG. 1 (b)) of a plurality of marks described on the recording medium and is provided with a singularity mark changer switch 11 and a plurality mark changer switch 12.

By operating an optional numeral key of ten numeral keys 13 arranged aside of the recording medium 1 after having operated the singularity mark changer switch 11, the mark described on the recording medium 1 corresponding to the key is accordingly selected.

In this case, it is supposed that an operator understands the relationship of correspondence between respective keys of ten numeral keys and the marks corresponding thereto.

On the other hand, if a key corresponding to the leading mark of consecutive marks and a key corresponding to the ending mark of the consecutive marks are pressed down after having operated the plurality mark changer switch 12, a plurality of consecutive marks in the area which is designated by these keys are accordingly selected.

In this case, ten numerals keys (not illustrated herein, by which for instance the number of copying operations per original document is inputted) which are provided in advance in the operation board 14 of the analog image forming apparatus can be also utilized instead of the above ten numeral keys 13.

As a matter of course, the singularity mark changer switch 11 and the plurality mark changer switch 12 can be omitted by eliminating such a feature as enabling two or more consecutive optional marks in the mark scanning area to be selected and constituting the system so that only a single mark can be selected.

In the embodiment, the recording medium 1 must travel by the mark travelling mechanism and the selected mark must be moved to the position of transfer in the sub scanning direction in order to transfer the mark selected by the mark selecting means to any optional position on the sheet of image transferring paper. The mark is moved to the position in which the ratio of magnification is taken into consideration in other cases than the equal ratio (the first controlling means).

In order to move the mark to an optionally appointed position, it is necessary to decide the position of the recording medium 1 in the initial state of transfer processing.

In this case, the initial position of the recording medium 1 is decided through detecting the reference line 17 provided on the recording medium 1 by for instance a reflection type phototube sensor 18. And a mark described on the recording medium 1 through the opening 5a can be moved to any optionally selected position which can be scanned by the optical system, by driving the stepping motor 10, standardizing the position of the reference line 17.

Also in this case, presence or absence of a mark on the recording medium 1 is judged when incrementally moving the recording medium 1, by providing, for instance, a CCD (mark detecting means) for detecting the shape of a mark on the recording medium 1 instead of the phototube sensor 18, and another mark can be described on the recording medium 1 as automatically stopping the blank area, corresponding to the opening 5a, skipping the area on which marks have been already described. Furthermore, if the mark detecting means is utilized, the shape of a mark on the recording medium 1 can be directly detected, thereby causing the recording medium 1 not to be driven by standardizing the position of the reference line 17 by means of the phototube sensor 18 and causing the recording medium 1 to be quickly driven and traveled to an optional position in the main scanning direction which can be scanned by the optical system with reference to the position of the mark (the second controlling means).

When the image of a mark is transferred to the sheet of image transferring paper, the paper feed timing for exposure scanning is adjusted. As a result, the position of describing (transferring) of the mark in relation to the sub scanning direction of the document is decided. The means for realizing such a feature is the paper feed timing adjusting means, and for instance it is realized by softwares or a timing circuit.

According to the amount of the paper feed timing adjustment by the paper feed timing adjusting means and the position of a mark positioned by the first controlling means (or the second controlling means) in the main scanning direction, other images than in the mark portion selected by the mark selecting means are erased on the photosensitive body, and a feature for extracting only the image of the selected marks is the mark extracting means. As a result, unnecessary marks can be prevented from being transferred to the sheet of image transferring paper.

In this case, there are the following ways to embody the mark extracting means, i.e., (1) providing a blank lamp 22 at the portions on the surface of photosensitive body 23 corresponding to other images than the selected mark portions (refer to FIG. 6), (2) not bringing the exposed light of particular portions to the surface of the photosensitive body by means of a shutter, and (3) changing the width of charging of an electrifying charger by means of a shutter, etc.

Furthermore, in the apparatus according to this embodiment, the first controlling means is so composed as to include a procedure for appointing the position of transferring of a mark and a procedure for driving the recording medium 1 up to the appointed position by controlling the mark travelling mechanism 2.

The position of transferring of the selected mark is appointed by operating the tablet 19 arranged on the document pusher 5, and the position of transferring of the mark is decided by the X-Y coordinate system by pointing out the appointed position on the surface of the tablet 19 with a stylus pen 19a.

Also, in the apparatus of this embodiment as shown in FIG. 1 (d), a singularity mark changer switch 11, a plurality mark changer switch 12, ten numerals keys 13, an increment switch 20 for jogging or inching the recording means 1 pitch by pitch (equivalent to the dimension in relation to the lengthwise direction of the opening 5a) and a tablet 19 are arranged on the document pusher 5. In the case that such a configuration is employed, parts having a function to transfer other marks than the document images onto a sheet of image transferring paper can be independently sold. It is preferable to extend the option of configuration thereof.

Consecutively, with reference to FIG. 3 (a), (b) and (c), the procedure for transferring the images of documents and the images of marks onto a sheet of image transferring paper by using the analog image forming apparatus is explained below;

Also, S1, S2, . . . in these figures show respective steps of action.

Firstly, a desired mark is manually described on the recording medium 1 through the opening 5a of the document pusher 5. One or more of such marks can be described through the opening 5a on the recording medium 1 which is advanced pitch by pitch whenever operating the increment switch 20.

As a desired mark is described on the recording medium 1 as shown in the above, a mark to be transferred to a sheet of image transferring paper is selected in the step S1 (corresponding to the mark selecting means).

In this case, when the singularity mark changer switch 11 is operated (FIG. 3(b) step S1a), a single mark to be transferred is selected by operating the key of a number corresponding to the mark to be transferred, of ten numeral keys 13 which expresses the sequence of describing of the plurality of marks (Step S1b).

Figure 3:
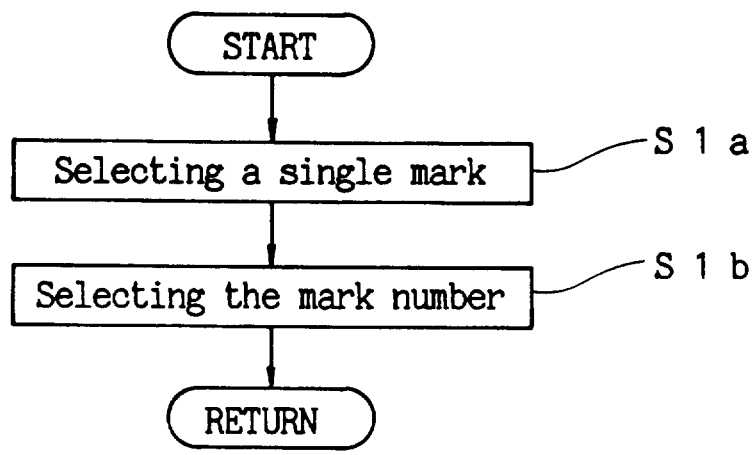
Figure 3:
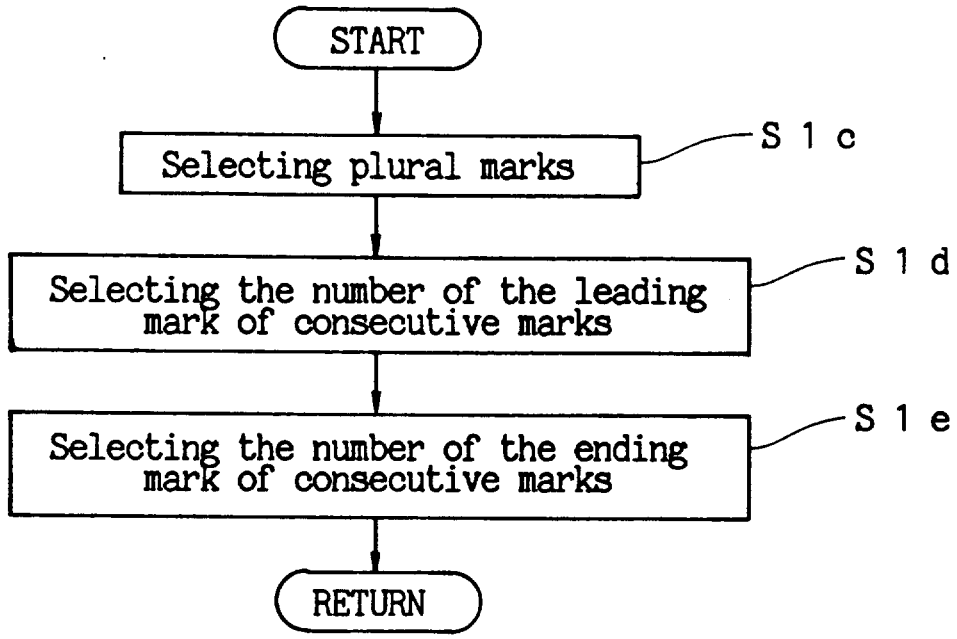
Figure 3:
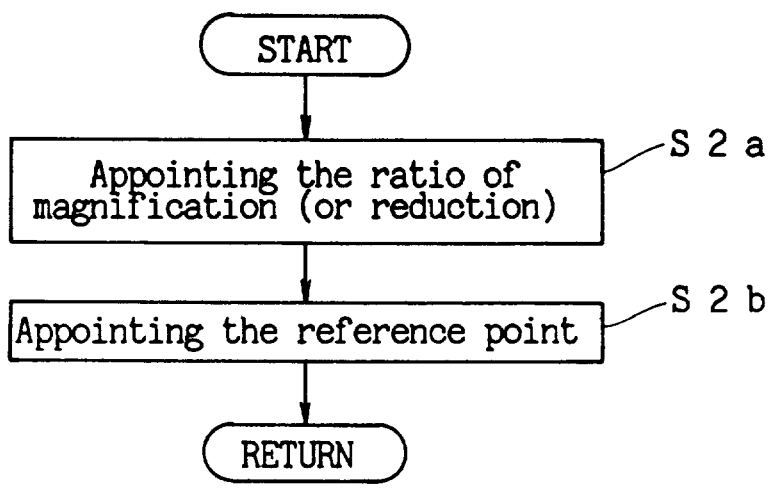
Figure 3:
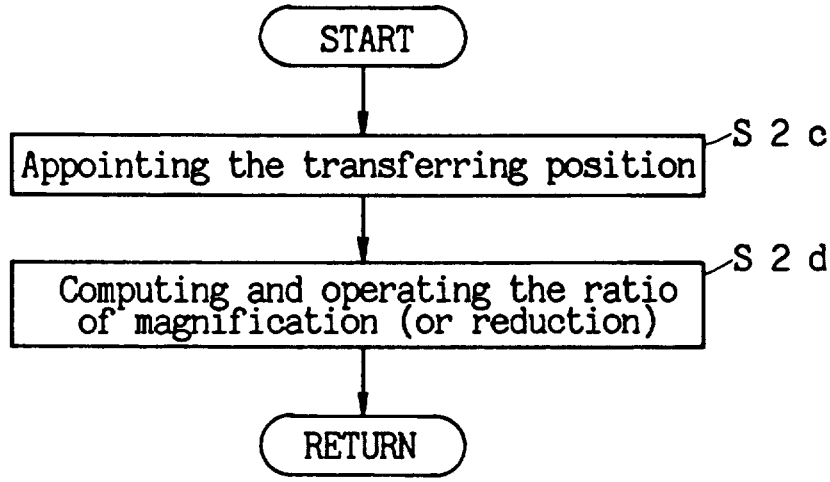
Figure 3:
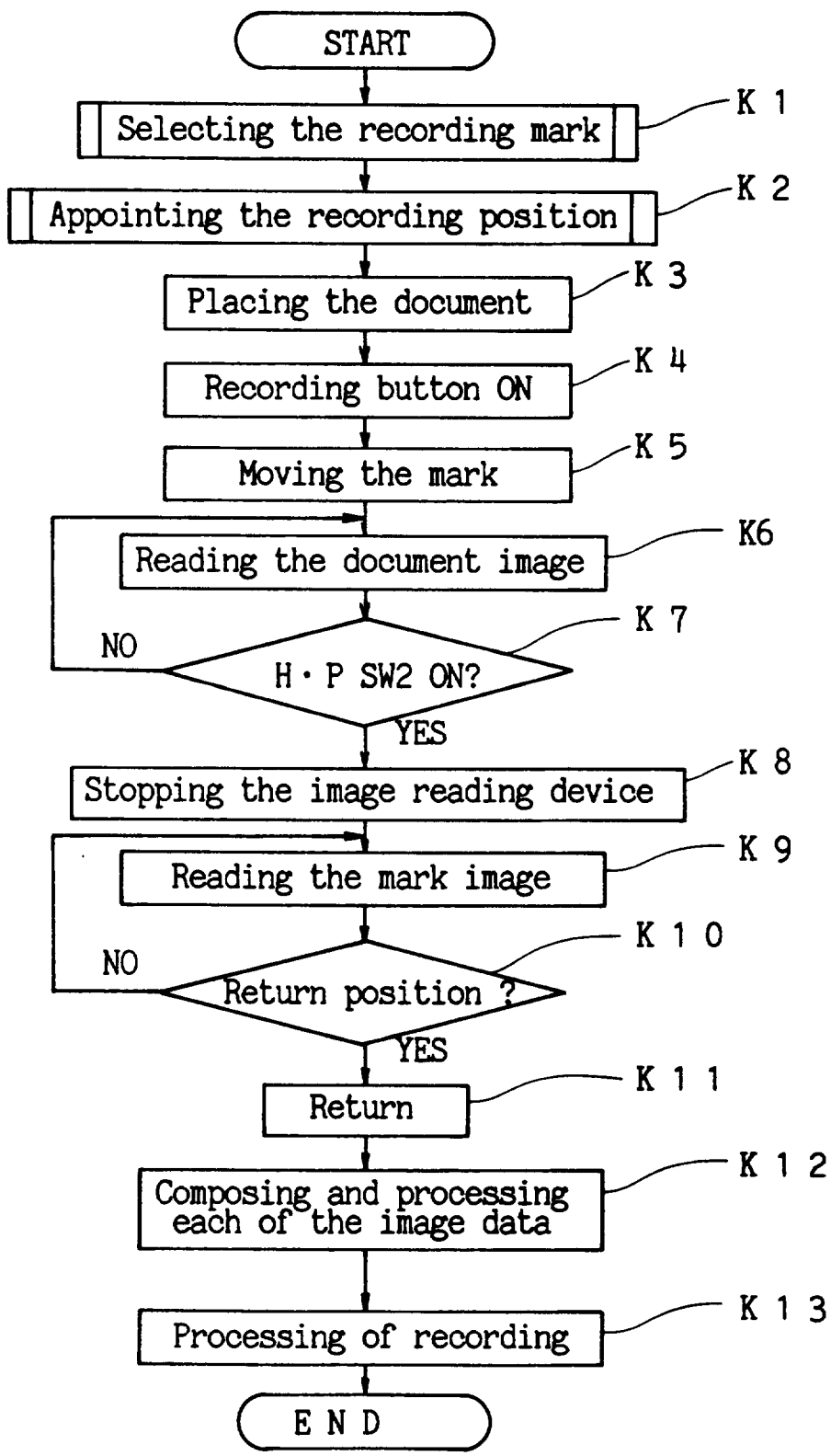

On the other hand, when the plurality mark changer switch 12 is operated (FIG. 3 (c) Step S1c), consecutively, a key of the number corresponding to the leading mark of the consecutive marks of the ten numeral keys 13 is operated (S1d) and furthermore a key of the number corresponding to the ending mark of the consecutive marks is operated (S1e).

As a result, all the marks in the area pointed out by the ten numeral keys are selected. A mark can be selected by a selector switch described below instead of ten numeral keys.

Namely, such a construction that an appointed mark is moved to the position in alignment with the opening 5a by using the increment switch 20 and the appointed mark can be selected by operating a selector switch (not illustrated) or a transfer button is available instead of selecting a mark to be transferred by operating the ten numeral keys.

As a mark to be transferred is selected as shown in the above, the transferring position on the sheet of image transferring paper is consecutively pointed out in the step S2.

Figure 2:
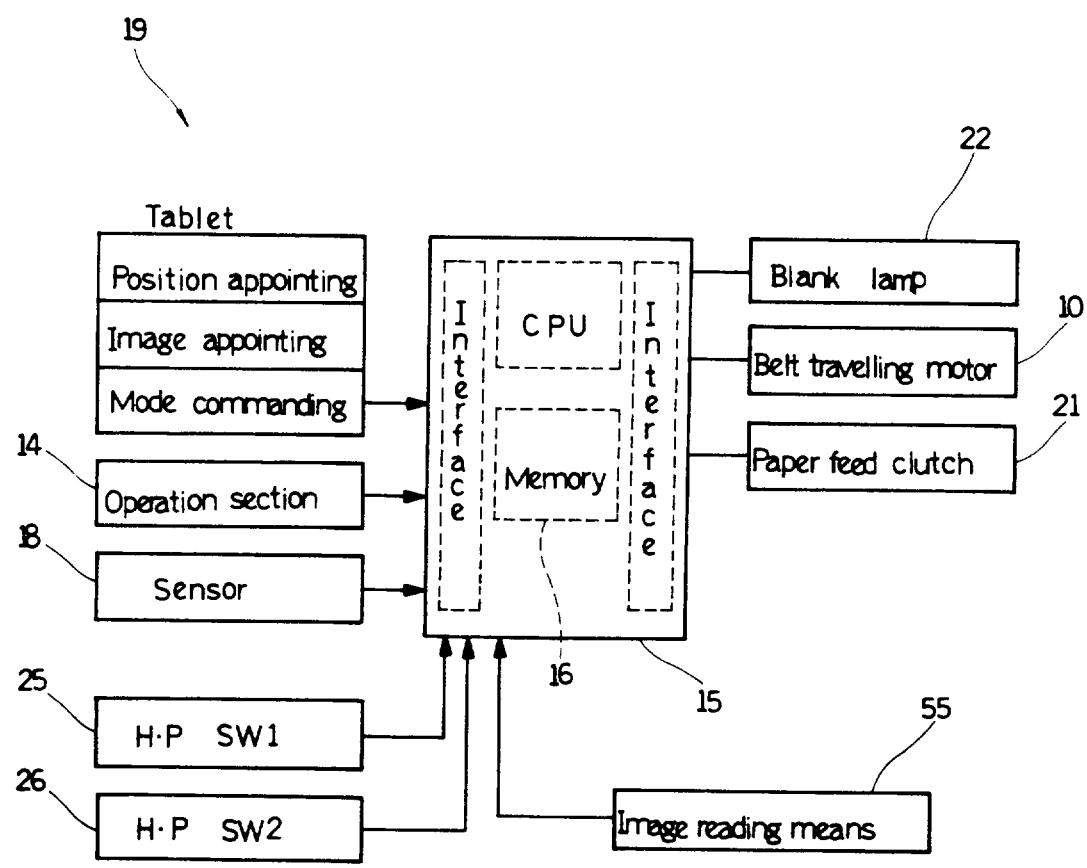
FIG. 2 is a block diagram showing one of the controlling systems of the analog or the digital image forming apparatus, FIG. 3 (a), (b), (c), (d), (e), (f) (g), and (h) are a flow chart one of the controlling procedures of the analalog or the digital image forming apparatus, respectively.

For instance, the transferring position of the mark on the sheet of image transferring paper is decided on the X-Y coordinate system by pointing out the transferring position by means a stylus pen 19a on the tablet 19 shown in FIG. 2. Completion of pointing out the transferring position on the tablet 19 is notified to a control device by pressing down the selector switch or a transfer button provided in the vicinity of the tablet 19, and a mark which exists in the opening 5a is selected by pressing down these switches and/or buttons.

And a document is placed on the document table 4 in the step S3, and the transfer button is operated in the step S4.

A document can be placed on the document table 4 prior to the action in the step S1.

Continuously, in the step S5, the first-time transfer processing is executed (corresponding to the usual transfer means).

Namely, the optical system 27 moves to the document placed on the document table 4, and the image thereof is scanned by the optical system 27 and is transferred to the sheet of image transferring paper.

Thereafter, the sheet of image transferring paper is temporarily stored in the intermediate tray 48.

Continuously, in the step S6, the recording medium 1 is driven and transferred (corresponding to the first controlling means) by controlling and driving the stepping motor 10.

Namely, the mark selected in the step S1 is moved to the transferring position in relation to the main scanning direction, appointed by using the tablet 19 in the step S2, which is the position scannable by the optical system 27.

So, in the step S7, the sheet of image transferring paper which is temporarily stored in the intermediate tray 48 is fed again.

At the same time, "ON" timing of the paper feed clutch 21 which can control rotation and stop of the pair of resist rollers 39 for the exposure scanning by the optical system 27 is adjusted by the distance in the sub scanning direction 6 of the mark transfer position appointed by using the tablet, thereby causing the mark transfer position on the sheet of image transferring paper in the sub scanning direction to be decided.

And the blank lamp 22 is controlled. Then, rejection exposure is given to the surface of the photosensitive body 33 corresponding to other images than those at the selected mark portion according to the amount of "ON" timing adjustment of the paper feed clutch 21 and the position of the mark specified in the step S6 in the main scanning direction. As a result, only the necessary mark images can be transferred to the position on the sheet of image transferring paper appointed by the tablet 19. Namely, the mark images can be composed together with the document images transferred in the step S5.

Therefore, in this preferred embodiment, an optional mark can be transferred and copied on the sheet of image transferring paper in a remarkably simple manner without re-inserting a card on which a mark is described in the case of a conventionally known apparatus.

In the above embodiment, the mark images are composed to the document images by the usual transfer means (Step S5). However, if the transfer processing in the step S5 is omitted, independent mark image can be transferred on the sheet of image transferring paper.

Figure 4:
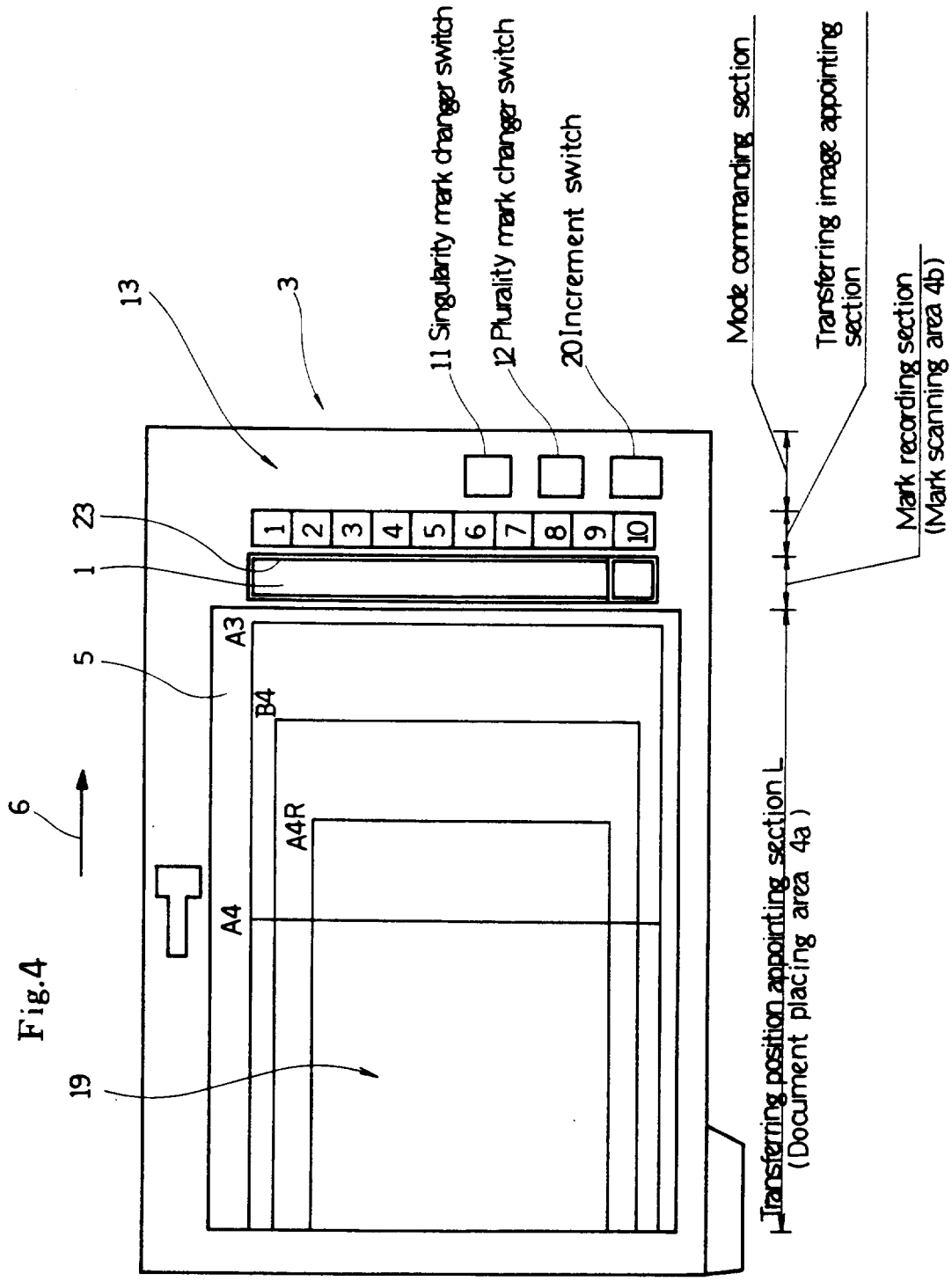
FIG. 4 and FIG. 5 show the structure and construction of the main portions of an analog or a digital image forming apparatus according to another embodiment of the present invention, respectively, and correspond to FIG. 1 (d).

Also, in an analog image forming apparatus according to the present invention, all the marks described in the recording medium 1 can be easily seen by installing a transparent sight window 23 at the position of installation of the recording medium 1 as shown in FIG. 4, thereby causing an optional mark to be selected easily.

Figure 5:
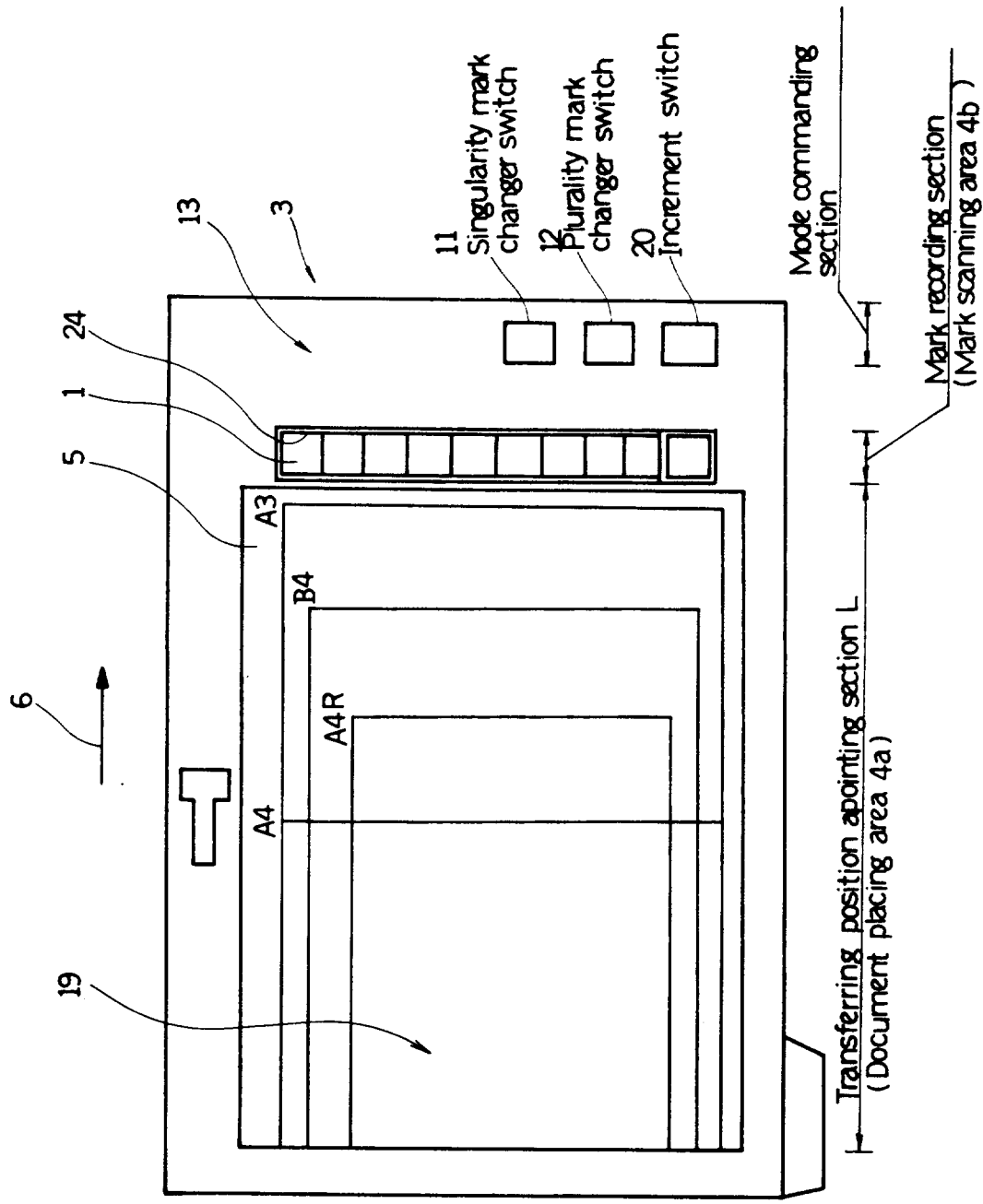

Furthermore, in an analog image forming apparatus according to the present invention, if as shown in FIG. 5 the ten numeral keys 13 can be omitted when a transparent touch panel 24 by which all the marks described in the recording medium 1 can be sighted is provided, and when such a construction that an optional mark can be selected by operating the portion on the transparent touch panel 24 corresponding to the mark, then it is possible to select any optional mark in further simple manner.

Still furthermore, in an analog image forming apparatus according to the present invention, the principal parts, including the recording medium 1, of a feature by which other marks than the document images can be transferred to to the sheet of image transferring paper can be removably installed on the document pusher 5.

Moreover, in the embodiment, a specified mode for always transferring a mark, for instance, at the central position in the main scanning direction at the forward end or the backward end of the sheet of image transferring paper can be provided in addition to specifying the mark transfer position on the X-Y coordinate system by means of position appointing means 19 like the tablet 19.

In the embodiment explained in the above, as it is necessary to make exposure scanning two times in all for the document and the mark when composing a mark image to the document image, the power consumption is large and the supporting members of the optical system is subjected to much wearing. Still further, the error of the transfer positioning will be increased according to long distance between the starting point of scanning of the optical system and the recording medium 1.

Besides, in the embodiment explained in the above, the transfer processing at the same magnification between the mark images on the recording medium 1 and the mark image to be transferred has been described. However, in actual image processing, it is highly recommended that the magnification of the marks is variable in relation to the document images to be composed.

For this reason, the second embodiment explained hereinafter relates to an analog image forming apparatus in which the document images can be composed to the mark images only with one-time exposure scanning, and the magnification of the mark images is variable. Also, the factors and members which are common to the constitution of the first preferred embodiment are given the same reference numbers and the explanation thereof is omitted.

In the second preferred embodiment, a home position switch 26 (H.P. SW2, the second detecting means) is further given, as shown in FIG. 1 (e), (f) and FIG. 2, in addition to a home position switch 25 (H.P. SW1, the first detecting means) for detecting the starting point of the travelling of the light source when the light source makes exposure scanning for usual documents.

The home position switch 25 is for detecting the first origin position of scanning of the optical system 27 (in details, the lamp unit 28 which constitutes the optical system 27) for the document placing area 4a on the document table 4 which is divided into the document placing area 4a and the mark scanning area 4b. For instance, a contact type limit switch or a non-contact type reflection phototube sensor, etc. may be used as this home position switch 25.

The home position switch 26 is arranged in the vicinity of the boundary portion between the document placing area 4a and the mark scanning area 4b and is for detecting the second origin position of scanning of the optical system 27 for the mark scanning area 4b. As well as the home position switch 25, for instance, a contact type limit switch or a non-contact type reflection phototube sensor, etc. may be used as home position switch 26.

Consecutively, the ensuing explanation copes with the procedure in the case of transferring the document images and the mark images on a sheet of image transferring paper by the analog image forming apparatus on the basis of FIG. 3 (b), (c), (d) and (e).

S1, S2, . . . , and N1, N2, . . . in the figures show the steps of respective actions.

The marks are described on the recording medium 1 and those to be transferred are selected (N1, S1a, S1b, S1c, S1d, S1e) by the same operation as those in the first preferred embodiment.

Next, the transfer position of the mark is pointed out (N2). In the case of the transfer in the same magnification, the operation thereof is the same as that in the first preferred embodiment.

When transferring the mark images on a sheet of image transferring paper with the mark magnified or reduced, the processing is executed in accordance with the following procedure shown in FIG. 3 (e).

Namely, the ratio of magnification or reduction of the mark images to the sheet of image transferring paper is firstly pointed out (Step S2a) by operating the ten numeral keys on the operation panel 14. Consecutively, the reference point on the sheet of image transferring paper on which the mark images are to be transferred is appointed (Step S2b) by indicating the transfer position at one point by means of a stylus pen on the tablet as well as in the above case.

It is possible to make the balance of the mark images reasonable to the document images by optionally magnifying or reducing the size of the mark to be transferred to the sheet of image transferring paper as shown in the above.

As the ratio of magnification or reduction (including the same ratio of magnification) of the mark and the reference point thereof are pointed out, a document is placed on the document table 4 in the step N3 and the transfer button is operated in the step N4.

Also, in this case, a document can be placed on the document table 4 prior to action in the step N1.

Then, the recording medium 1 is driven and moved by controlling and driving the stepping motor 1 in the step N5.

Namely, the mark selected in the step N1 is moved to the transfer position, where the mark can be scanned by the optical system 27, in relation to the main scanning direction responsive to the ratio of magnification or reduction and the reference point appointed in the step N2. In this case, if the center position pertaining to the sub scanning direction of a mark on the recording medium 1 is selected to the reference point, it is enough that even though the ratio of magnification or reduction is not the same ratio the recording medium 1 is simply moved to the center of the composition position on the document in the main scanning direction. However, in the sub scanning direction, the transfer position must be moved in response to the ratio of magnification or reduction by adjusting the paper feed timing, which described later. In case that the reference point is biased in the sub scanning direction, for instance, the reference point is set at the shoulder portion of a mark on the recording medium 1, the travelling position of the recording medium 1 in the main scanning direction should be computed and operated in taking the ratio of magnification or reduction into consideration, and it is necessary to further adjust the paper feed timing of a sheet of image transferring paper, described later, only by the amount of biasing in the sub scanning direction by the set ratio of magnification or reduction.

Subsequently, the optical system 27 is moved for scanning from the first origin position of scanning of the optical system 27 detected by the home position switch 25 in the step N6, and the image of a document placed in the document placing area 4a is transferred to a sheet of image transferring paper. The transfer operation in this step N6 has no difference from usual transfer processing and is the same as those of the usual transfer means in the first preferred embodiment on which the ratio of magnification or reduction has been taken into consideration. However, in this preferred embodiment, the optical system 27 does not return in the direction of the home position switch 25 but goes toward the mark scanning area 4b.

Namely, the lamp unit 28 of the optical system 27 temporarily makes a pause at the position detected by the home position switch 26 (Steps N7 and N8) to cause the sheet of image transferring paper to be temporarily accommodated in the intermediate tray 48 (outside the figure).

Consecutively, the sheet of image transferring paper which is temporarily accommodated in the intermediate tray 48 is sent out toward the photosensitive body again and it temporarily comes to a stop when the leading edge thereof is inserted into a pair of the resist rollers 39 (Step N9).

And in the step N10 the paper feed timing of the sheet of image transferring paper is adjusted. At the same time, a group of lens 29 and mirrors 32d, 32e, etc for changing the ratio of magnification or reduction, which constitute the optical system 27, are reasonably moved and adjusted in response to the ratio of magnification or reduction.

Namely, the "ON" timing of the paper feed clutch 21 for the exposure scanning by the optical system 27 is adjusted, and the reference point on the mark on the sheet of image transferring paper for the sub scanning direction and the transferring position according to the ratio of magnification or reduction are decided.

So, in the step N11, the sheet of image transferring paper is fed again. And at the same time, the lamp unit 28 is subjected to scanning from the second origin position of scanning of the lamp unit 28 of the optical system 27 detected by the home position switch 26, thereby causing the selected mark to be transferred to an appointed position (i.e., the area on the basis of the reference point) on the sheet of image transferring paper on which the document image has been transferred.

The blank lamp 22 is controlled when making the transfer processing, and the rejection exposure is made at the portion of the surface of the photosensitive body 22 corresponding to other images than those in the mark portion selected in the above, in response to the amount of "ON" timing adjustment of the paper feed clutch 21 and the position of the mark specified in the step N5 in the main scanning direction. As a result, only the mark image of the required ratio of magnification or reduction can be transferred to the desired position, pointed out by the tablet 19, on the sheet of image transferring paper.

Thereafter, the lamp unit 28 of the optical system 27 returns to the position detected by the home position switch 25 (in the steps N12 and N13).

Therefore, in this preferred embodiment, the image of a document is transferred to the sheet of image transferring paper by letting the lamp unit 28 scan from the first origin position of scanning of the lamp unit 28 of the optical system 27, and furthermore the mark images can be transferred to the sheet of image transferring paper by letting the lamp unit 28 scan from the second origin position of scanning without that the lamp unit 28 returns to the first origin position of scanning. Therefore, the time required for the lamp unit 28 to travel over the distance "L" in the lengthwise direction of the document placing area 4a can be saved, thereby causing the time of actuation of lamp unit 28 and the distance of action thereof to be shortened.

Also, as respective scanning actions of the lamp unit 28 are started from each of the origin position of scanning detected by the home position switches 25 and 26 in response to each of the images of the document and the mark, respectively, it is possible to prevent the positional displacement of the mark image to the document image, which is apt to occur when only the origin position of scanning detected by the home position switch 25 is used as origin position of scanning. As a result, the image of the mark can be very highly accurately positioned on the sheet of image transferring paper in relation to the image of the document for the sake of transfer processing.

In the second embodiment, the travelling amount of the recording medium 1, i.e., of the mark, is determined by pointing out the reference position for transferring the mark and the ratio of magnification or reduction when making a transfer with the ratio of magnification or reduction changed. However, the ratio of magnification or reduction can be operated by pointing out the mark scanning area on the sheet of image transferring paper, and the travelling amount of the mark can be determined on the basis of the ratio of magnification or reduction operated therein. Means for accomplishing this feature is the area appointing means and the magnification (or reduction) ratio operating means described below.

The area appointing means is embodied by a tablet 19 as position appointing means described later in the apparatus according to this embodiment. In this case, the transferring position on the sheet of image transferring paper is specified by pointing out two area appointing points of, for instance, the left upper edge and the right lower edge of the area of an mark image to be transferred. Also, the transferring position can be specified in the X-Y coordinate system by operating the ten numeral keys on the operation panel 14 instead of the tablet 19.

The magnification (or reduction) ratio operating means is for operating the ratio of magnification or reduction of the mark image to the sheet of image transferring paper on the basis of the transferring position of the mark appointed by the area appointing means. And this ratio of magnification or reduction can be computed and operated by comparing the area of the opening 5a and the area of a markimage to be transferred to the sheet of image transferring paper.

In details, the area appointing means and the magnification (or reduction) ratio operating means are realized as the steps S2c and S2d in FIG. 3 (f), i.e., as appointing procedure of the transferring position (area) of the selected mark on the sheet of image transferring paper.

Namely, firstly, as well as in the above case, the transferring area on the sheet of image transferring paper, on which the image of the mark is to be transferred is pointed out by indicating the transferring position at two points by using a stylus pen 19a on the tablet 19 (Step S2c in FIG. 3 (f)). Subsequently, in the step S2d, the ratio of magnification or reduction of the image of the mark is calculated.

As shown in the above, the balance of the image of the mark to the image of the document is made reasonable by making the size of the mark to be transferred to the sheet of image transferring paper optionally variable.

As the ratio of magnification or reduction (including the same magnification) of the image of the mark and the transferring area are determined, a document is placed on the document table 4 in the step N3, and the transfer button is operated in the step N4. Then, the processing from N5 through N13 is executed as well as in the above description.

Figure 7:
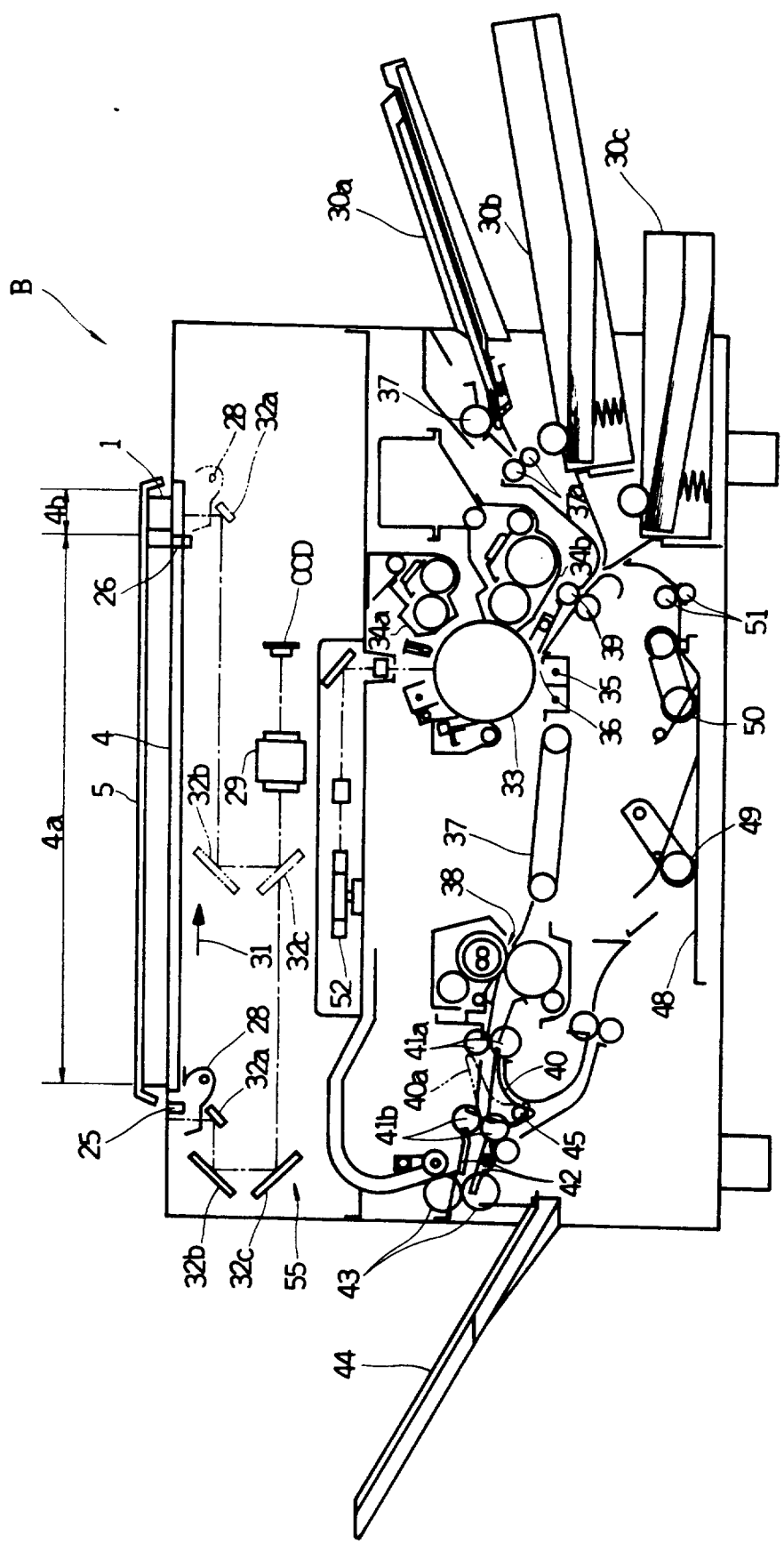
FIG. 7 is a rough elevational view showing the whole configuration of one of the examples of a digital copying machines to which the present invention is applicable.

Continuously, an preferred embodiment in a digital image forming apparatus is described. The digital duplicating machine which is one of the examples of a digital image forming apparatus B shown in FIG. 7 stores optical image data obtained by scanning a document through exposing light thereto in a memory as digital signals, takes out the image data by searching for this memory according to the necessity, drives a laser device according to the digital image data, and forms electrostatic latent image on a photosensitive body by light diffusion means like a polygon mirror, etc. And this digital image forming apparatus is different from an analog image forming apparatus A shown in FIG. 6 in the hardwares at the point that it is provided with a CCD for converting the optical image data to electric signals, a conversion/memory means (outside the Figure) for converting the signals coming from the CCD to digital amounts and memorizing them, a laser device and a polygon mirror 52. However, there is no difference between the aforementioned analog image forming apparatus and this digital image forming apparatus in other hardware configuration.

When embodying the present invention in the digital image forming apparatus on the basis of the above differences, the following differences shown below occur in the softwares and hardwares. The ensuing description copes with the preferred embodiment according to the present invention which is embodied in the digital image forming apparatus, centering around the points unique thereto.

Also, the factors which are common to those described in the analog image forming apparatus are given the same reference numbers and the description thereof is omitted or simplified hereinafter.

The third embodiment shown below copes with the example of such a construction that the mark images and the document images can be composed on a sheet of image transferring paper.

The recording medium 1, arrangement thereof, and drive mechanism thereof, etc. which are utilized in the third embodiment are the same as those used in the first preferred embodiment and are as shown in FIG. 1 (a) through (c). The detailed description thereof is omitted herein.

The mark selecting means for selecting one or two or more marks of a plurality of the marks described on the recording medium 1 and the mark travelling mechanism for driving and travelling the belt-like recording medium 1 to move the mark(s) selected by the mark selecting means are the same as those shown in the first embodiment. Therefore, the description thereof is omitted herein.

Furthermore, as the third and the fourth controlling means for controlling the mark travelling mechanism and for driving the recording medium to an optional position is the same as the first controlling means that is described in relation to the first embodiment, the explanation thereof is also omitted herein.

A primary line sensor CCD for converting the images obtained by scanning of the optical system as shown in the above to electric signals is utilized. The optical system can expose light to and can scan a document placed on the document table 4 as a matter of course and a mark described on the recording medium 1. Therefore, the primary line sensor CCD can read both the document and the mark, separately. The analog image data read by the primary line sensor CCD is converted to digital image data by an analog/digital converter (A/D converter) (outside the Figures) and is memorized in a digital graphical memory outside the Figures. In this embodiment, image reading means consists of the primary line sensor CCD, an A/D converter and the graphical sensor. The image reading means can read only the mark. At this time, it can be named as mark reading means.

The data of the mark image, selected by the mark selecting means, of the mark images read by the image reading means (or the mark reading means) is extracted in the memorized memory map (by the data extracting means. For instance, after the data is once escaped in a separate memory, it is processed and composed together with the data of the document image which has been read in advance (corresponding to the composing processing means).

Finally, the image data, which is obtained by the composing processing, equivalent to one sheet of the sheet of recording paper is outputted to the laser device responsive to the recording position on the sheet of recording paper, thereby causing the transfer processing to be successfully executed.

In a digital image forming apparatus according to the present invention, though the recording position of a mark on a sheet of recording paper can be fixedly set in advance when making the record processing by the record processing means, the data of the mark image, whose mark data extracted corresponding to the position appointing means 19 like the tablet, etc. for pointing out the recording position of a mark on the sheet of recording paper can be outputted for recording processing so that setting of the position of the mark can be promptly changed in a simple manner as shown in the apparatus of this embodiment.

Consecutively, on the basis of FIG. 3(g), (b) and (c), the ensuing description explains the procedure for recording the image of a document and the image of marks on the sheet of recording paper by the digital image forming apparatus.

Also, S1, S2, . . . , and J1, J2, . . . in the figures show respective steps of process.

Firstly, a desired mark is manually described on the recording medium 1 through the opening 5a of the document pusher 5. One or more of such marks can be described through the opening 5a on the recording medium 1 which is advanced pitch by pitch whenever operating the increment switch 20.

As a desired mark is described on the recording medium 1 as shown in the above, a mark to be recorded on the sheet of recording paper is selected in the step J1 (Refer to FIG. 3 (g)) (corresponding to the mark selecting means).

In this case, when the singularity changer switch 11 is operated (FIG. 3 (b) Step S1a), a single mark to be recorded is selected by operating the key of a number corresponding to the mark to be recorded, of ten numeral keys 13 which expresses the sequence of describing of the plurality of marks (Step S1b).

On the other hand, when the plurality mark changer switch 12 is operated (FIG. 3 (c) Step S1c), consecutively, a key of the number corresponding to the leading mark of the consecutive marks of the ten numeral keys 13 is operated (S1d) and furthermore a key of the number corresponding to the ending mark of the consecutive marks is operated (S1e).

As a result, all the marks in the area pointed out by the ten numeral keys are selected.

Also in this case, such a configuration that a desired mark is moved to the position in alignment with the opening 5a and the desired mark can be selected by operating a selector switch (not illustrated) can be employed instead of selecting the mark to be recorded by operating the ten numeral keys 13.

As an appointed mark to be thus recorded is selected, the recording position of the mark on the sheet of recording paper is pointed out in the step J2.

For instance, the recording position of the mark on the sheet of recording paper is specified in the X-Y coordinate system by pointing out the recording position by means of a stylus pen on the tablet shown in FIG. 2.

And in the step J3, a document is placed on the document table 4. And in the step J4, the recording button is operated.

A document can be placed on the document table 4 prior to action in the step J1.

Continuously, in the step J5, the recording medium 1 is driven and moved by controlling and driving the stepping motor 10 (The third controlling means).

Namely, the mark selected in the step J1 is moved to the position where it can be read by an image reading means 55 (lamp unit 28, mirrors 32a through 32c, a group of lens 29 and CCD).

And, in the step J6, the image reading means 55 moves relatively to the document, thereby causing the image of the mark on the recording medium 1 and the image of the document placed on the document table 4 to be read by the image reading means 55. The data thus read in the above is temporarily memorized in the memory.

Consecutively, in the step J7, the data of the mark image, selected by the mark selecting means, of the image data which is temporarily memorized in the above is extracted (corresponding to the fourth data extracting means), and the data of the extracted mark image and the data of the document image can be processed and composed (corresponding to the composing processing means).

In this case, the data is processed in the memory map, corresponding to the mark recording position appointed in the step J2.

In the step J8, the image data processed and composed in the step J7 is outputted, corresponding to the recording position on the sheet of recording paper for recording and processing (corresponding to the second recording/processing means).

Namely, the paper feed clutch 21 is turned on at an appointed timing and a sheet of recording paper is fed to the recording section (transfer section 36), and the image of the document is recorded on the sheet of recording paper, and at the same time the selected mark is also recorded at the appointed position on the sheet of recording paper.

Therefore, in the apparatus disclosed by the present invention, an optional mark can be transferred to a sheet of recording paper in a remarkably simple manner without re-inserting a card on which a mark is described as shown for the conventional apparatus.

In the case of recording only the mark image without composing together with a document image, only the mark image is read in the step J6, and the mark image is moved to a desired position in the step J7 and is to be recorded thereon (corresponding to the first recording means).

Besides, in a digital image forming apparatus according to the present invention, it is possible to select any of optional marks by directly sighting all the marks described on the recoding medium 1 if a transparent sight window 23 is provided at the installation position of a recording medium 1 as shown in FIG. 4, too.

Furthermore, in a digital image forming apparatus according to the present invention, as shown in FIG. 5, it is possible to select an appointed mark in a further simple manner if the system is so composed that the ten numeral keys 13 can be omitted and a transparent touch panel 24 by which all the marks described on the recording medium 1 can be seen can be installed and an optional mark can be selected by operating the portion on the transparent touch panel 24.

Still furthermore, in a digital image forming apparatus according to the present invention, the main portion of a feature for transferring other marks, including the recoding medium 1, than the document images on a sheet of recording paper can be removably provided on the document pusher 5.

Moreover, in the above embodiment, for instance, a specified mode by which a mark is usually transferred to the central position in the main scanning direction at the front leading side and/or the rear ending side of a sheet of recording paper can be provided in addition to specifying the recording position of a mark on the X-Y coordinate system by the position appointing means (tablet) 19.

It is necessary to heighten the accuracy of the reading position of a mark document to extract a mark document. Hence, in the above embodiment, as the mark document is located far from the home position, the accuracy of the image position for reading the mark document from the side of the home position one after another can not be heightened.

Also, in the third embodiment, only the transfer processing at the same magnification has been described. Actually however, it is highly recommended that the mark image can be promptly magnified or reduced in relation to the document image to be composed in actual image processing.

For this reason, in the fourth embodiment explained hereinafter, the home position unique to the mark image is provided, thereby causing the position detecting accuracy of the mark image to be heightened. Also, the ensuing description copes with a digital image forming apparatus in which the mark image can be promptly magnified or reduced.

All the factors and members which are common to the third embodiment of the present invention are given the same reference numbers, and the explanation thereof is omitted or shortened herein.

In the fourth embodiment, as shown in FIG. 1 (e), (f) and FIG. 2, another home position switch 26 (H.P. SW2, the second detecting means) is provided in addition to the home position switch 25 (H.P. SW1, the first detecting means) for detecting the starting point of a light source movement when the light source makes an exposure scanning for a usual document.

Such a home position switch 26 (H.P., SW2) is of the same construction as that which is used for the second embodiment. The home position 26 is arranged in the vicinity of the boundary portion between the document placing area 4a an the mark scanning area 4b, and is for detecting the second origin position of movement of the image reading means 55 in connection to the mark scanning area 4b. As well as the above home position switch 25, for instance, a contact type limit switch or a non-contact type reflection phototube sensor, etc. may be used as this home position switch 26.

The ratio of magnification or reduction of the mark image for the sheet of recording paper can be inputted by operating the ten numeral keys in the operation panel 14 (magnification (or reduction) ratio appointing means).

The mark reading means according to this embodiment is for moving the lamp unit 28 from the second origin position of movement, which is detected by the home position switch 26, and for reading the mark images according to patterns on the basis of each data of the ratio of magnification (or reduction) appointed by the magnification (or reduction) ratio appointing means and the reference point appointed by the reference point appoint means described later by promptly adjusting the image reading means 55 and/or the position in the main scanning direction of the mark image described on the sheet of recording paper.

The followings are considered to be examples of the above patterns;

(1) In the case of reading a mark image by adjusting the image reading means 55:

In this case, a group of lens 29, which constitute the image reading means 55 are promptly moved and adjusted according to the ratio of magnification (or reduction). And the recording position of the mark images in the main scanning direction and the sub scanning direction to the document images can be set by composing and processing the data obtained by reading each of the images according to softwares.

(2) In the case of reading the mark images by adjusting the position of the mark images in the main scanning direction:

In this case, the mark travelling mechanism 2 is controlled by the above controlling means, and the position of the mark image in the main scanning direction is adjusted by moving the recording medium 1 to an appointed position. And the position of the mark image to the document image in the sub scanning direction and the ratio of magnification (or reduction) can be set by processing and composing the data obtained by reading each of the images according to the softwares.

(3) In the case of reading the mark images through adjustment described in the above (1) and (2):

In this case, the mark travelling mechanism 2 is controlled by the controlling means. At the same time, the lens 29, etc. are promptly moved for adjustment. And the position of the mark images to the document images in the sub scanning direction is set by processing and composing the data obtained by reading each of the images according to the softwares.

(4) In the case of reading the mark images without making any adjustment described in the above (1), (2), or (3):

In this case, the mark travelling mechanism 2 is controlled by the controlling means, thereby causing the recording medium 1 only to be moved to an appointed position facing to the lamp unit 28, and the position of the mark images to the document images in the main scanning direction and in the sub scanning direction and furthermore the ratio of magnification (or reduction), etc., are set by processing and composing the data obtained by reading each of the images according to the softwares.

The ensuing description copes with the explanation thereof under a premise of the case (4).

In the apparatus according to this embodiment, it is needless to say that the mark images can be recorded on a sheet of recording paper at equal ratio without any magnification or reduction by appointing the ratio of magnification (or reduction) to "1" or omitting the magnification (or reduction) appointing means or the reference point appointing means.

Consecutively, on the basis of FIG. 3(b), (c), (e), and (h), the ensuing description explains the procedure for recording mark images and document images on a sheet of recording paper by means of the digital image forming apparatus.

S1, S2, ... and K1, K2, ... in these figures means the steps of process.

For this procedure, a program shown in FIG. 3 (h) is executed as main routine.

Here in FIG. 3 (h), the procedures in the steps K1 through K5 (Selecting a mark to be recorded→Appointing the recording position→Placing a document-→Turning on the recording button→Moving the mark) are completely the same as those from the steps J1 through J5 in the third embodiment. So, the explanation thereof is referred to that for the steps J1 through J5.

Consecutively, in the step K6, the lamp unit 28 is moved from the first origin position of moving of the lamp unit, which is detected by the home position switch 25, thereby causing the image of a document placed on the document placing area 4a to be read (corresponding to the document reading means).

Thereafter, the lamp unit 28 makes a pause at the point when the second origin point is detected by the home position switch H.P. SW2 (the steps K7 and K8).

At this time, in the case that it is necessary to adjust the corresponding apparatus in accordance with the ratio of magnification (or reduction) appointed by the magnification (or reduction) ratio appointing means and the reference point appointed by the reference point appointing means, a group of the lens 29, etc. and the recording medium 1 are moved and controlled. Also, in this case, the recording medium 1 can be moved prior to movement of the lamp unit 28.

The reference point appointing means is for appointing the reference point on the sheet of recording paper on which the mark image is to be recorded. In the apparatus according to this embodiment, the reference point appointing means is embodied by a tablet 19. Also, the reference point can be specified on the X-Y coordinate system by operating the ten numeral keys in the operation panel 14 instead of the tablet 19.

Next, the lamp unit 28 is moved from the second origin point of movement of the lamp unit 28, which is detected by the home position switch 26, thereby causing the mark images to be read (in the step K9).

Each of the data read as shown in the above is temporarily memorized in a memory. And the lamp unit 28 of the image forming device 27 which has completed the action of reading the images returns to the first origin point of movement, which is detected by the home position switch 25 (in the steps K10 and K11).

Consecutively, in the step K12, the data of the mark images, selected by the mark setting means 3, of the mark images temporarily memorized as shown in the above is extracted. Then, the data of this extracted mark image can be processed and composed together with the data of the document images.

In this case, the data is processed in the memory map, corresponding to the mark recording position and the ratio of magnification (or reduction) appointed in the step K2.

So, in the step K13, the image data processed and composed in the step K12 is outputted to the recording position on the sheet of recording paper, thereby causing the recording thereof to be processed and executed.

Namely, the paper feed clutch 21 is turned on at an appointed timing and a sheet of recording paper is fed toward the recording section. And the image of a document is recorded on the sheet of recording paper. At the same time, the selected mark is recorded at an appointed position on the sheet of recording paper according to the appointed ratio of magnification (or reduction).

What is claimed is:

1. An analog image forming apparatus in which an optical system moves relatively to a document, thereby causing an image of the document to be scanned by the optical system and to be transferred to a sheet of image transferring paper, comprising:
   a belt-like recording medium in which a plurality of optional marks can be physically described,
   mark selecting means for selecting an appointed mark or two or more consecutive marks of a plurality of marks described in the recording medium,
   a mark travelling mechanism for driving and travelling the belt-like recording medium so that a mark selected by the mark selecting means can be moved,
   first control means for controlling the mark travelling mechanism and for driving the recording medium to an optional position,
   paper feed timing adjusting means for adjusting the timing of paper feed for the exposure scanning and for feeding paper when making an image transfer, and
   first mark extracting means for extracting an image of the portion of a mark selected by the mark selecting means according to the timing adjustment amount by the paper feed timing adjusting means and the position of a mark positioned in the main scanning direction by the first controlling means.

2. An analog image forming apparatus in which an optical system moves relatively to a document, thereby causing an image of the document to be scanned by the optical system and to be transferred to a sheet of image transferring paper, comprising:
   a conventional transfer means for transferring the image of a document onto a sheet of image transferring paper,
   a belt-like recording medium in which a plurality of optional marks can be physically described,
   mark selecting means for selecting one mark or two or more consecutive marks of a plurality of marks described in the recording medium,
   a mark travelling mechanism for driving and travelling the belt-like recording medium so that a mark selected by the mark selecting means can be moved, first control means for controlling the mark travelling mechanism and for driving the recording medium to an optional position, mark transferring means for transferring the image of the mark onto a sheet of image transferring paper, paper feed timing adjusting means for adjusting the timing of paper feed for the exposure scanning and for feeding paper when transferring the image of the mark to a sheet of image transferring paper by the mark transferring means, and first mark extracting means for extracting an image of the portion of a mark selected by the mark selecting means according to the timing adjustment amount by the paper feed timing adjusting means and the position of a mark positioned in the main scanning direction by the first controlling means.

3. An analog image forming apparatus as claimed in claim 2, wherein the recording medium is arranged on a document pusher.

4. An analog image forming apparatus as claimed in claim 2, wherein the recording medium is arranged at the forward side in the sub scanning direction for the document.

5. An analog image forming apparatus as claimed in claim 2, wherein the mark transferring means include different magnification transferring means for transferring a mark image at a different ratio of magnification appointed when transferring a mark.

6. An analog image forming apparatus as claimed in claim 2, wherein the mark selecting means includes changer switches for selecting a single mark and plural marks.

7. An analog image forming apparatus as claimed in claim 2, wherein the mark selecting means includes ten numeral keys for appointing the number of a mark.

8. An analog image forming apparatus as claimed in claim 2, wherein the mark selecting means comprises an input switch including a transfer button, and composed such that a mark located at an appointed position can be selected when pressing down the input switch.

9. An analog image forming apparatus as claimed in claim 2, wherein the mark selecting means includes an opening by which only a single mark can be seen, and composed such that the mark which can be seen through the opening can be selected.

10. An analog image forming apparatus as claimed in claim 9, wherein the opening is formed on the upper surface of a document pusher for pressing the document on the document plate.

11. An analog image forming apparatus as claimed in claim 2, wherein the mark selecting means includes a selector switch which informs an operator of completion of the inputting by a tablet, and composed such that the mark which is located at an appointed position can be selected when pressing down the selector switch.

12. An analog image forming apparatus as claimed in claim 2, wherein the mark selecting means includes a transparent sight window through which all the marks faced toward an operator can be seen.

13. An analog image forming apparatus as claimed in claim 2, wherein the mark travelling mechanism includes an increment switch by which the recording medium can be driven and moved pitch by pitch by an appointed amount.

14. An analog image forming apparatus as claimed in claim 2, wherein the mark travelling mechanism comprises a set of rollers by which the recording medium can be driven and moved.

15. An analog image forming apparatus as claimed in claim 2, wherein the mark travelling mechanism includes a stepping motor for moving the recording medium.

16. An analog image forming apparatus as claimed in claim 2, wherein the recording medium is composed of a white endless belt.

17. An analog image forming apparatus as claimed in claim 2, wherein the recording medium, the mark selecting means and the mark travelling mechanism are provided at a document pusher.

18. An analog image forming apparatus as claimed in claim 2, wherein the recording medium, the mark selecting means, the mark travelling mechanism and a tablet are provided at a document pusher.

19. An analog image forming apparatus as claimed in claim 2, wherein the first mark extracting means is composed of a blank lamp.

20. An analog image forming apparatus as claimed in claim 2, wherein the first controlling means includes a tablet for appointing the travelling position of the selected mark in the main scanning direction.

21. An analog image forming apparatus as claimed in claim 20, wherein the tablet is formed on the upper surface of a document pusher.

22. An analog image forming apparatus as claimed in claim 2, wherein the first controlling means includes a sensor for reading the reference line described on the recording medium, and composed such that means for travelling the recoding medium to an appointed position, standardizing the signal coming from the sensor, can be provided therein.

23. An analog image forming apparatus as claimed in claim 2, wherein automatic changing means of image transferring paper is provided for composed transfer processing of a mark image or a document image by the mark transferring means or the usual transferring means by automatically supplying again a sheet of image transferring paper to a paper supplying portion on which a document image or a mark image is transferred by a conventional transferring means or the mark transferring means.

24. An analog image forming apparatus in which an optical system moves relatively to a document, thereby causing the image of the document to be scanned by the optical system and to be transferred to a sheet of image transferring paper, comprising;

a belt-like recording medium in which a plurality of optional marks can be physically described, mark selecting means for selecting one mark or two or more consecutive marks of a plurality of marks described in the memory medium, a mark travelling mechanism for driving and travelling the belt-like recording medium so that a mark selected by the mark selecting means can be moved, mark detecting means for detecting the shape of a mark on the recording medium, second controlling means for controlling the mark travelling mechanism on the basis of the results of detecting the shape of the mark by the mark detecting means and for driving the recording medium to an optional position, paper feed timing adjusting means for feeding paper as adjusting the timing of paper feed for the exposure scanning when making an image transferring, and second mark extracting means for extracting an image of the portion of a mark selected by the mark selecting means according to the timing adjustment amount by the paper feed timing adjusting means and the position of the main scanning direction of a mark positioned by the second controlling means.

25. An analog image forming apparatus in which an optical system moves relatively to a document, thereby causing an image of the document to be scanned by the optical system and to be transferred to a sheet of image transferring paper, comprising;
- a conventional transferring means for transferring the image of a document onto a sheet of image transferring paper,
- a belt-like recording medium in which a plurality of optional marks can be physically described,
- mark selecting means for selecting one mark or two or more consecutive marks of a plurality of marks described in the memory medium,
- a mark travelling mechanism for driving and travelling the belt-like recording medium so that a mark selected by the mark selecting means can be moved,
- mark detecting means for detecting the shape of a mark on the recording medium,
- second controlling means for controlling the mark travelling mechanism on the basis of the results of detecting the shape of the mark by the mark detecting means and for driving the recording medium to an optional position,
- mark transferring means for transferring the image of the mark onto a sheet of image transferring paper,
- paper feed timing adjusting means for adjusting the timing of paper feed for the exposure scanning and for feeding paper when transferring the image of the mark to a sheet of image transferring paper by the mark transferring means, and
- second mark extracting means for extracting an image of the portion of a mark selected by the mark selecting means according to the timing adjustment amount by the paper feed timing adjusting means and the position of a mark positioned in the main scanning direction by the second controlling means.

26. An analog image forming apparatus in which an optical system moves relatively to a document, thereby causing an image of the document to be scanned by the optical system and to be transferred to a sheet of image transferring paper, comprising;
- first detecting means for detecting the first origin position of scanning of the optical system to the placing area of the document on the document table which is divided into the placing area of document and the scanning area of a mark,
- second detecting means placed in the vicinity of the boundary portion between the placing area of the document and the scanning area of the mark for detecting the second origin position of scanning of the optical system to the scanning area of the mark,
- a recording medium arranged in the scanning area of the mark, in which an optional mark can be described,
- a conventional transferring means for transferring the image of a document placed in the placing area of the document onto a sheet of image transferring paper by letting the optical system scan from the first origin position of scanning of the optical system, which is detected by the first detecting means, and
- consecutive mark transferring means for consecutively transferring the image of a mark described on the recording medium onto the sheet of image transferring paper on which the image of the document is described by the usual transferring means, by letting the optical system scan from the second origin position of scanning of the optical system which is detected by the second detecting means.

27. A digital image forming apparatus in which an optical system moves relatively to a document, thereby causing an image of the document to be read by an optical reading means and to be recorded on a sheet of recording paper, comprising:
- a belt-like recording medium in which a plurality of optional marks can be physically described,
- mark selecting means for selecting one or more marks of a plurality of the marks described in the recording medium,
- a mark travelling mechanism for driving and travelling the belt-like recording medium so that a mark selected by the mark selecting means can be moved,
- third controlling means for controlling the mark travelling mechanism and for driving the recording medium to an optional position,
- mark reading means for reading the image of a mark on the recording medium driven to an appointed position by the third controlling means,
- third data extracting means for extracting the data of the mark image selected by the mark selecting means of the mark images read by the mark reading means, and
- first recording processing means for outputting the data of the mark image extracted by the third data extracting means, corresponding to the recording position on a sheet of recording paper for recording processing.

28. A digital image forming apparatus as claimed in claim 27, wherein the recording medium is arranged on a document pusher.

29. A digital image forming apparatus as claimed in claim 27, wherein the recording medium is arranged at the forward side in the sub scanning direction to the document.

30. A digital image forming apparatus in which an optical system moves relatively to a document, thereby causing an image of the document to be read by an optical reading means and to be recorded on a sheet of recording paper, comprising;
- a belt-like recording medium in which a plurality of optional marks can be physically described,
- mark selecting means for selecting one or more marks of a plurality of the marks described in the recording medium,
- a mark travelling mechanism for driving and travelling the belt-like recording medium so that a mark selected by the mark selecting means can be moved,
- third controlling means for controlling the mark travelling mechanism and for driving the recording medium to an optional position,
- image reading means including the optical system and the optical reading means for reading the image of a mark on the recording medium driven to an appointed position by the third controlling means and the image of a document placed on the document table, fourth data extracting means for extracting the data of the mark image selected by the mark selecting means of the mark images read by the image reading means, composing processing means for composing the data of the mark images extracted by the fourth data extracting means and the data of the document images, and second recording processing means for outputting the data of images composed and processed by the composing processing means, corresponding to the recording position on the sheet of recording paper.

31. A digital image forming apparatus in which an optical system moves relatively to a document, thereby causing an image of the document to be read by an optical reading means and to be recorded on a sheet of recording paper, comprising;

a belt-like recording medium by which a plurality of optional marks can be physically described, mark selecting means for selecting one or more marks of a plurality of the marks described in the recording medium, a mark travelling mechanism for driving and travelling the belt-like recording medium so that the mark selected by the mark selecting means can be moved, mark detecting means for detecting the shape of a mark on the recording medium, fourth controlling means for controlling the mark travelling mechanism on the basis of the results of detecting the mark shape by the mark detecting means and for driving the recording medium to an optional position, mark reading means for reading the image of a mark on the recording medium driven to an appointed position by the fourth controlling means, third data extracting means for extracting the data of the mark image selected by the mark selecting means of the mark images read by the mark reading means, and first recording processing means for outputting the data of the mark image extracted by the third data extracting means, corresponding to the recording position on a sheet of recording paper for recording processing.

32. A digital image forming apparatus in which an optical system moves relatively to a document, thereby causing an image of the document to be read by an optical reading means and to be recorded on a sheet of recording paper, comprising;

a belt-like recording medium by which a plurality of optional marks can be physically described, mark selecting means for selecting one or more marks of a plurality of the marks described in the recording medium, a mark travelling mechanism for driving and travelling the belt-like recording medium so that the mark selected by the mark selecting means can be moved, mark detecting means for detecting the shape of a mark on the recording medium, fourth controlling means for controlling the mark travelling mechanism on the basis of the results of detecting the mark shape by the mark detecting means and for driving the recording medium to an optional position, image reading means including the optical system and the optical reading means for reading the image of a mark on the recording medium driven to an appointed position by the fourth controlling means and the image of a document placed on the document table, fourth data extracting means for extracting the data of the mark image selected by the mark selecting means of the mark images read by the image reading means, composing processing means for composing the data of the mark images extracted by the fourth data extracting means and the data of the document images, and second recording processing means for outputting the data of images composed and processed by the composing processing means, corresponding to the recording position on the sheet of recording paper.

33. A digital image forming apparatus in which an optical system moves relatively to a document, thereby causing an image of a document to be read by an optical reading means and to be recorded on a sheet of recording paper, comprising;

first detecting means for detecting the first origin position of moving of the optical system to the placing area of the document on the document table which is divided into the placing area of document and the scanning area of a mark, second detecting means placed in the vicinity of the boundary portion between the placing area of document and the scanning area of the mark for detecting the second origin position of moving of the optical system to the scanning area of the mark, a recording medium arranged in the scanning area of the mark, in which an optional mark can be described, document reading means for reading the image of the document placed in the placing area of the document by moving the optical system from the first origin position of moving of the optical system which is detected by the first detecting means, mark reading means for reading the image of the mark described on the recording medium by moving the optical system from the second origin position of moving of the optical system, which is detected by the second detecting means, composing processing means for composing a part or the whole of the image data read by the mark reading means and the image data read by the document reading means, and third recording processing means for outputting the image data composed and processed by the composing processing means, corresponding to the recording position on a sheet of recording paper.

* * * * *